US012573408B1

(12) United States Patent
Ansari et al.

(10) Patent No.: US 12,573,408 B1
(45) Date of Patent: Mar. 10, 2026

(54) INPUT PROCESSING WITH PROFILE CONTEXT

(71) Applicant: Amazon Technologies, Inc., Seattle, WA (US)

(72) Inventors: Raju Ansari, Bothell, WA (US); Alok Upadhyay, Bellevue, WA (US); Zhengyang Wu, Kenmore, WA (US); Bharath Bhimanaik Kumar, Sammamish, WA (US); John Charles Howard, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 546 days.

(21) Appl. No.: 18/122,476

(22) Filed: Mar. 16, 2023

(51) Int. Cl.
    *G10L 17/00*     (2013.01)
    *G10L 17/06*     (2013.01)
    *G10L 17/22*     (2013.01)

(52) U.S. Cl.
    CPC .............. *G10L 17/22* (2013.01); *G10L 17/06* (2013.01)

(58) Field of Classification Search
    CPC . G10L 15/1815; G10L 15/22; G10L 15/1822; G10L 2015/228; G10L 15/16; G10L 15/183; G10L 15/30; G10L 2015/221; G10L 15/222; G10L 2015/225; G10L 2015/223; G10L 15/083; G10L 15/00; G10L 15/26; G06F 40/35; G06F 40/295; G06F 40/30; G06F 16/24575; G06F 40/20; G06F 40/00; G06F 40/279; G06F 40/284; G06F 40/289; G06F 40/40; G06N 3/0442; G06N 3/0455; G06N 3/0475; G06N 3/08; G06N 3/02; G06N 3/042;
    (Continued)

(56) References Cited

U.S. PATENT DOCUMENTS

| | | | |
|---|---|---|---|
| 11,551,663 B1 * | 1/2023 | Bissell | .................... G06F 3/167 |
| 12,412,574 B1 * | 9/2025 | Ryan | ....................... G10L 15/22 |

(Continued)

FOREIGN PATENT DOCUMENTS

WO    WO-2015196063    * 12/2015  ............. G06F 21/32

OTHER PUBLICATIONS

Burggräf, Peter, et al. "Preferences for single-turn vs. multiturn voice dialogs in automotive use cases—results of an interactive user survey in germany." IEEE Access 10 (2022): 55020-55033. (Year: 2022).*

*Primary Examiner* — Edgar X Guerra-Erazo
(74) *Attorney, Agent, or Firm* — Pierce Atwood LLP

(57)             ABSTRACT

A speech-processing system may be configured to provide certain endpoints (e.g., skills and/or applications) with data reflecting an explicitly selected user profile. When handling requests from a device configured to support a session context (e.g., a personal device), the skill may handle multiple requests in an interaction (e.g., a "session") using the selected profile as the session context, even if the system recognizes a different user for one or more of the requests. Thus, if the system recognizes more than one user using a personal device during an interaction with the skill (e.g., playing a game or requesting songs), the skill may handle each request of the interaction according to the selected profile. For a device not configured to support a session person, however, (e.g., a communal device) the skill may handle each request according to the recognized profile regardless of an explicitly selected profile.

20 Claims, 14 Drawing Sheets

(58) Field of Classification Search
CPC ........ G06N 3/043; G06N 3/044; G06N 3/045;
G06N 3/0464; G06N 3/048; G06N 3/047;
G06N 3/088; G06N 3/0895; G06N 3/09;
G06N 3/091; G06N 3/092; G06N 3/094;
G06N 3/096; G06N 3/098; G06N 3/0985;
G06N 20/00; G06N 20/20; G06N 20/10
See application file for complete search history.

(56) References Cited

U.S. PATENT DOCUMENTS

2018/0366125 A1* 12/2018 Liu ........................ G10L 17/06
2024/0061835 A1* 2/2024 Subramanian ........ G06F 16/252

* cited by examiner

Figure 8:
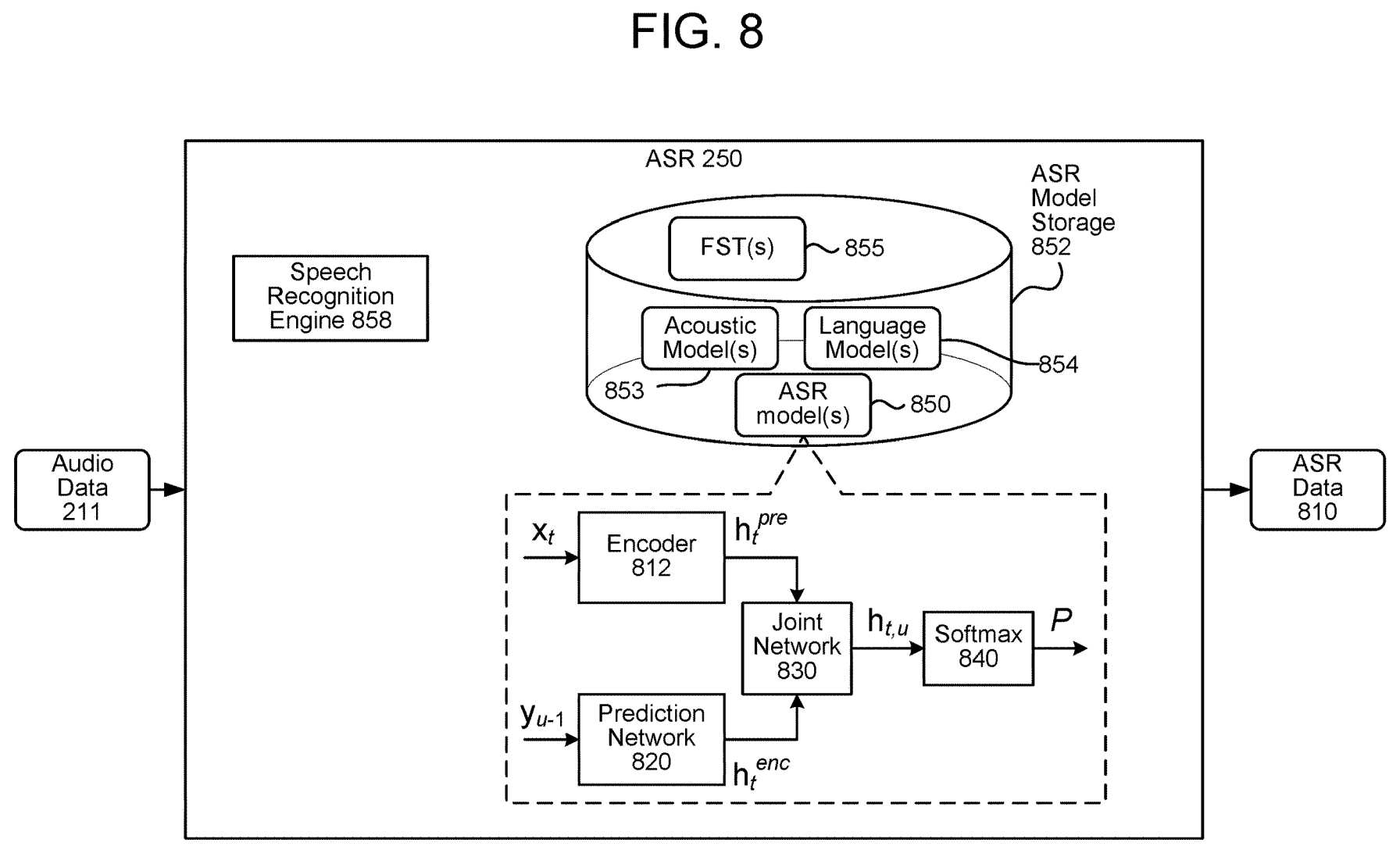

ASR Data 810

Audio Data 211

ASR 250

Speech Recognition Engine 858

ASR Model Storage 852

854

FST(s) 855

Language Model(s)

Acoustic Model(s)

853

ASR model(s) 850

Encoder 812

$h_t^{pre}$ $x_t$

Joint Network 830

$h_{t,u}$

Softmax 840

$P$

Prediction Network 820

$h_t^{enc}$ $y_{u-1}$

FIG. 9

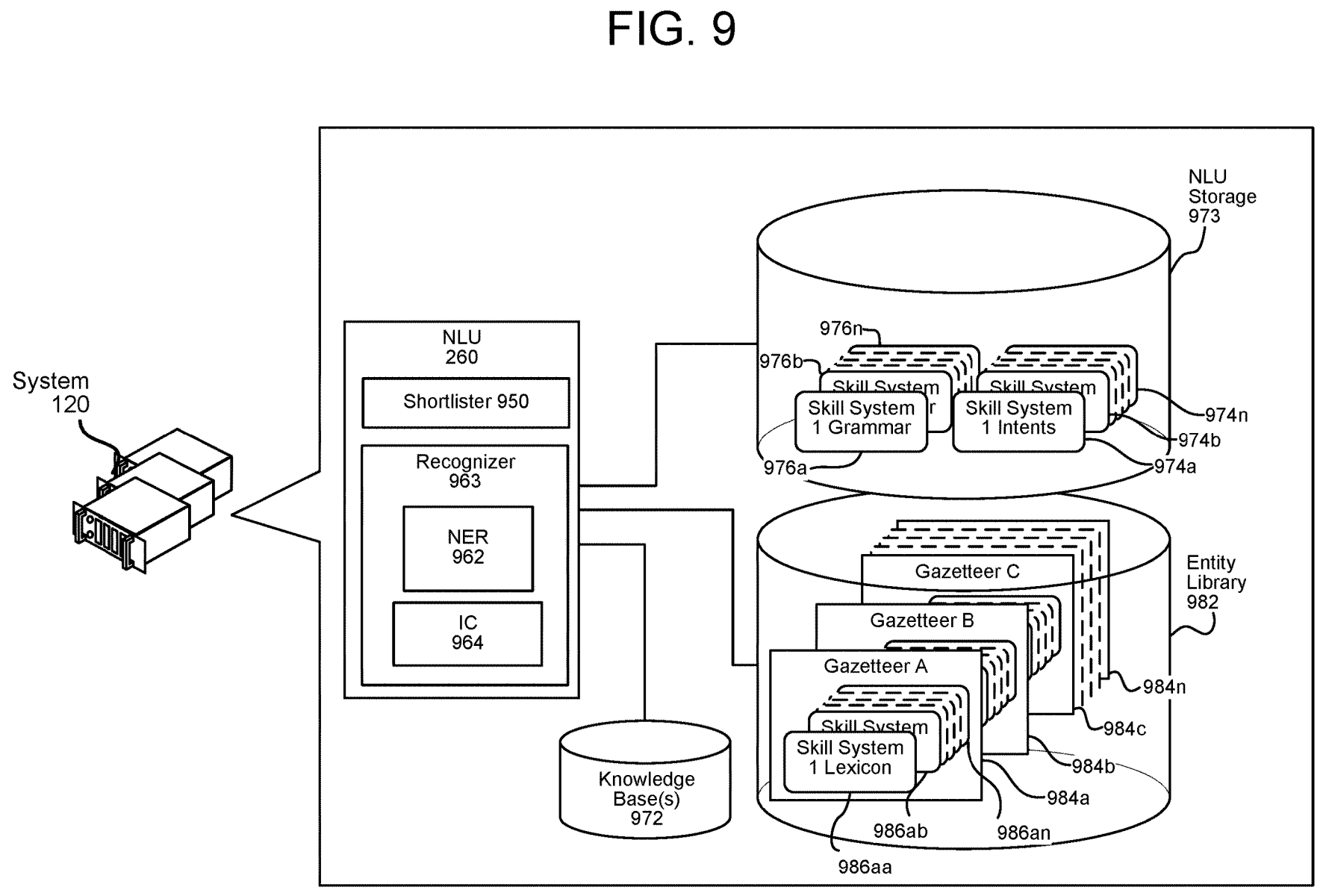

NLU Storage 973

Skill System 974n
Skill System 974b
Skill System 1 Intents 974a

Skill System 976n
Skill System 976b
Skill System 1 Grammar 976a

Entity Library 982

Gazetteer C 984n
Gazetteer B 984c
Gazetteer A 984b

Skill System 986an
Skill System 986ab
Skill System 1 Lexicon 986aa

984a

Knowledge Base(s) 972

NLU 260

Shortlister 950

Recognizer 963

NER 962

IC 964

System 120

System(s) 120/225

Bus 1324

Network(s) 199

I/O Device Interfaces 1302

Controller(s) / Processor(s) 1304

Memory 1306

Storage 1308

INPUT PROCESSING WITH PROFILE CONTEXT

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 5 is a conceptual diagram of components of a session manager component, according to embodiments of the present disclosure.

FIG. 8 is a conceptual diagram of an ASR component, according to embodiments of the present disclosure.

FIG. 9 is a conceptual diagram of how natural language processing is performed, according to embodiments of the present disclosure.

FIG. 10 is a conceptual diagram of how natural language processing is performed, according to embodiments of the present disclosure.

FIG. 13 is a block diagram conceptually illustrating example components of a system, according to embodiments of the present disclosure.

DETAILED DESCRIPTION

Speech processing systems and speech generation systems have been combined with other services to create virtual "assistants" that a user can interact with using natural language inputs such as speech, text inputs, or the like. The assistant can leverage different computerized voice-enabled technologies. Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Natural Language Generation (NLG) includes enabling computers to generate output text or other data in words a human can understand, such as sentences or phrases. Text-to-speech (TTS) is a field of computer science concerning transforming textual and/or other data into audio data that is synthesized to resemble human speech. ASR, NLU, NLG, and TTS may be used together as part of a speech-processing/virtual assistant system.

Figure 14:
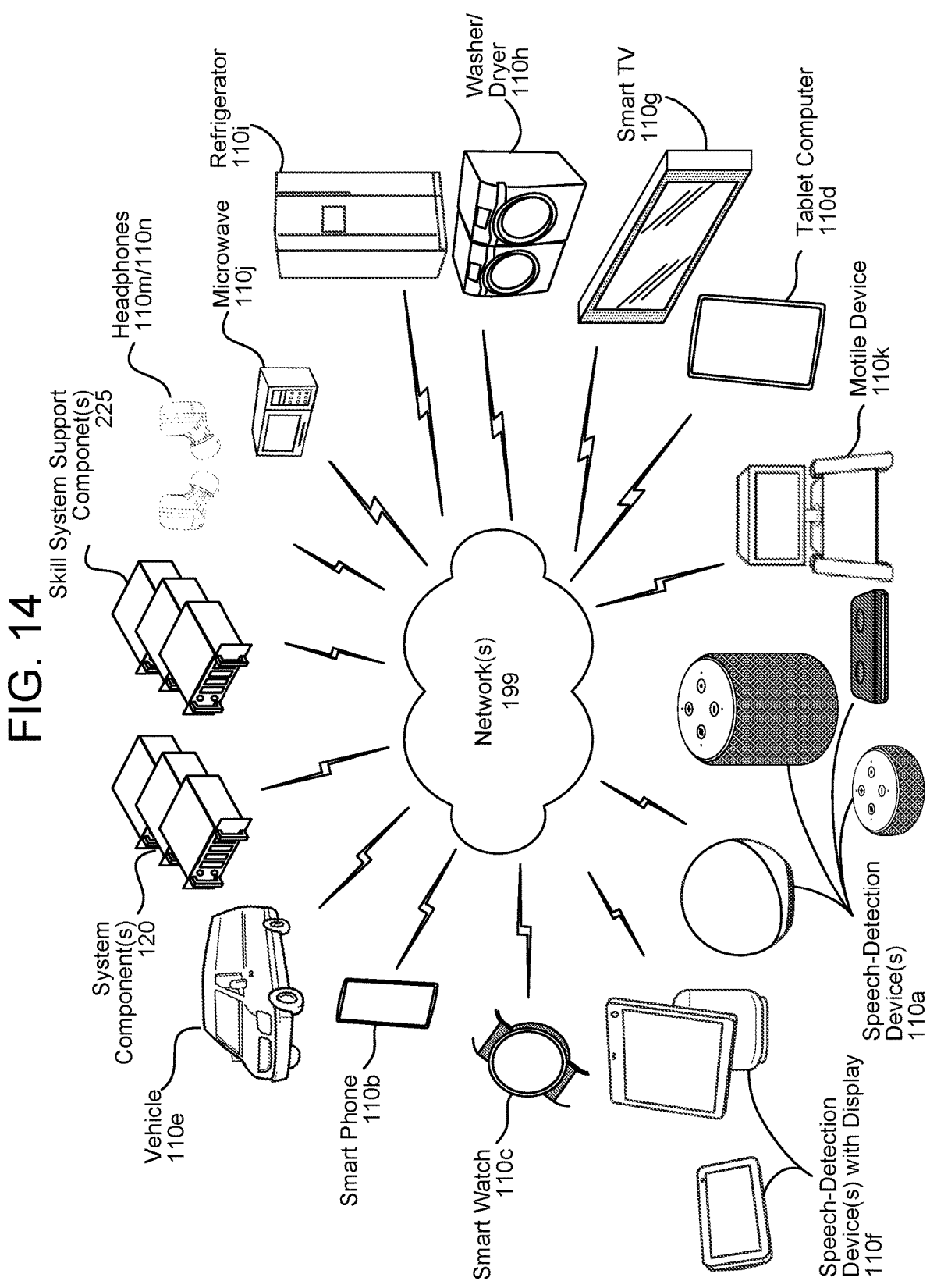
FIG. 14 illustrates an example of a computer network for use with the overall system, according to embodiments of the present disclosure.

A user, and in some cases multiple users, may interact with the virtual assistant by speaking to and/or receiving synthesized speech from a user device (such as one of the user devices 110 shown in FIG. 14 and described herein). The user device may work in conjunction with one or more system components. The user device and/or system component may include and/or interface with various skills to perform actions for and/or on behalf of the user(s). A skill may be software customized to perform one or more actions as indicated by a user, business entity, device manufacturer, etc. What is described herein as a skill may be referred to using many different terms, such as an application, app, speechlet, service, bot, action, or the like. For example, the system may include skills for watching TV, playing music, online shopping, vehicle navigation, controlling smart-home devices, etc. In some cases, the skills may execute on the user device, on a separate device, and/or in one or more system components. The skills, devices, and/or other system components that handle users inputs may be referred to "end points." An end point may handle a user input based in part on profile context. The profile context may represent, for example, a user (or group of users) and/or device configuration corresponding to the input. In some cases, a user device may be configured to receive inputs from a single user (e.g., a "personal" device), while in other cases a user device may be configured to receive inputs from multiple users (e.g., a "communal" device).

The system may determine a profile context for handling an input. The profile context may correspond to data that may be used to respond to the input, such as a video and/or music library, login credentials, saved payment methods, etc. For example, if a user requests to stream music, a music streaming application may determine a profile identifier to use as the profile context for the input and retrieve a music library corresponding to that profile identifier. The system may determine a profile context using, for example, biometric signals, presence detection signals, an explicitly selected profile (e.g., a profile selected by a user), recently used profile contexts, etc. In some cases, a profile context may apply to a one input (e.g., an "input context"). In some cases, a profile context may apply to multiple inputs in a multi-turn interaction with a particular skill (e.g., a "session context").

The system may determine a profile context for a given input differently (e.g., based on different signals or by applying different priorities to different signals) depending on whether the user device is configured as personal device or communal. A "personal device" may refer to a device associated with a single, primary user. The device may operate in, for example, a private space such as a home, vehicle, office, etc., where users other than the primary user, if any, are likely trusted by the primary user. A personal device may be configured to handle multiple inputs received in a single, multi-turn interaction according to a single user profile as indicated by a session context. A session context may describe a profile context to be used when processing multiple inputs of a multi-turn interaction, referred to herein as a "session." Thus, if the system receives a user input at a personal device and determines the user input corresponds to an existing session having a session context, the system may process the user input according to a user profile indicated by the session context, even if the input is associated with a different user profile (e.g., based on the result of user recognition processing). For example, a trivia game may take place over a session spanning multiple user inputs and system responses. In some cases, the inputs may come from multiple different users answering different questions. If the user device and/or the trivia game skill are configured to support a session context, the system may determine to provide an experience corresponding to a session context. Thus, the system may determine a user profile when the game is initiated and continue to use that user profile as the profile context for the duration of the session.

In the case of a communal device, however, the system may determine not to use a session context. A communal device may be available to multiple users such as family members of a household, guests in a hotel, visitors to an information kiosk in a public place, etc. Thus, the use of a session context may be less desirable for customer experience reasons. The system may, however, provide a skill end point with information regarding user recognition, presence detection, explicitly selected profile(s), and/or user device configuration. This may enable the skill itself (e.g., a content provider corresponding to the skill) to determine whether or not to provide a session context-based customer experience. These features may benefit content providers by offering them more data and flexibility to tailor their customer experience according to the nature of the content and/or service provides. The features may additionally benefit users by offering them a customer experience appropriate for setting in which they provide their inputs. These and other features of the disclosure are described in additional detail with reference to the accompanying drawings.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 1:
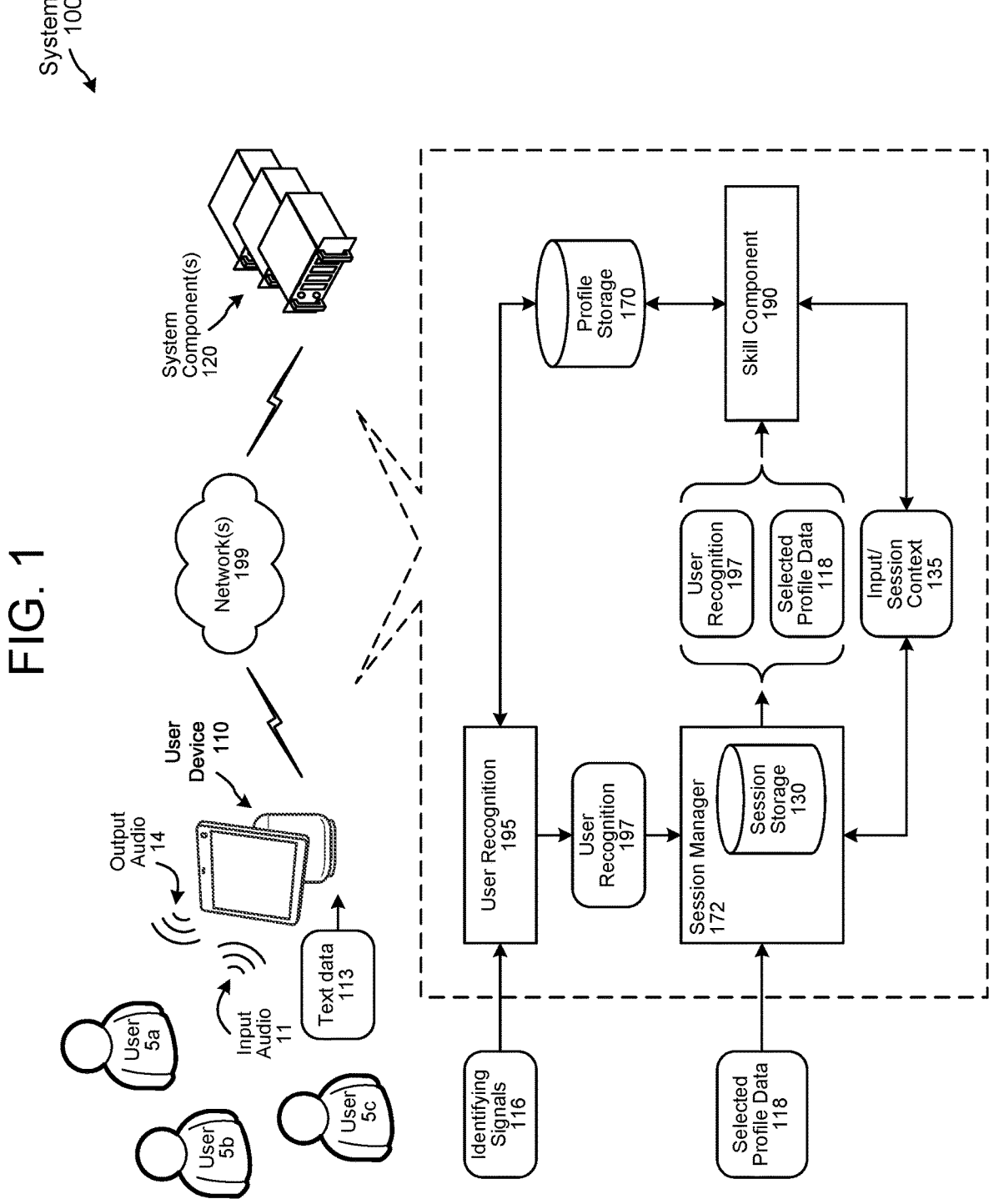
FIG. 1 is a conceptual diagram illustrating operation of a speech processing system configured to process user inputs using a profile context, according to embodiments of the present disclosure.

FIG. 1 is a conceptual diagram illustrating operation of a speech processing system 100 configured to process user inputs using a profile context, according to embodiments of the present disclosure. One of more users 5a, 5b, 5c, etc. (collectively "users 5") may provide speak to or otherwise input requests/commands of the system 100. The system 100 may receive user inputs (e.g., input audio 11 (e.g., including user 5 speech), text data 113 (e.g., typed by a user 5), etc.), and respond with output audio data 14 (e.g., synthesized speech, music, etc.) or other output (e.g., images on a display). In some implementations, the user device 110 may process the input and provide output. In some implementations, the system 100 may include one or more system components 120 which may aid in processing user inputs and/or providing other functionality to the user 5. The system 100 may process the speech and/or other input using components described further with reference to FIG. 2 and others. The various components may reside and/or execute on the user device 110, one or more system components 120, and/or divided or duplicated between various devices/components of the system 100. Once the system 100 has processed the input (e.g., by determining an intent and/or entity in the user input), the system 100 may send command data to an endpoint such as the skill component 190 shown in FIG. 1. As used herein, a skill component represents hardware and/or software configured to perform the functions of a skill. Thus, the skill component 190 may receive and process command data determined from the input. In some implementations, more than one skill may execute on a single skill component, and more than one skill component may perform the functions of a single skill. The command data may represent, for example, an action for the system to perform for and/or on behalf of a user 5. Example actions may include responding to the user with requested information such as an answer to a question asked by the user, making an online purchase for the user, sending a message to another user 5, stream media such as music or a movie, provide vehicle navigation, control physical devices (e.g., locks, lights, environmental controls, etc., in a smart home system), etc.

A skill component may be software running on the user device 110 and/or one or more system component(s) 120 that is akin to a software application. That is, a skill component 190 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, speechlet, service, or the like. The system 100 may be configured with more than one skill component 190. For example, a weather service skill component may enable the system 100 to provide weather information, a car service skill component may enable the system 100 to book a trip with respect to a taxi or ride sharing service, a restaurant skill component may enable the system 100 to order a pizza with respect to the restaurant's online ordering system, etc. A skill component 190 may operate in conjunction between the various devices of the system 100, such as the user device 110 and/or system component(s) 120, in order to complete certain functions.

Inputs to a skill component 190 may come from speech processing interactions or through other interactions or input sources. A skill component 190 may include hardware, software, firmware, or the like that may be dedicated to a particular skill component 190 or shared among different skill components 190.

In some cases, the system 100 may process a input using additional context information such as location of the user device 110, hardware and/or software capabilities of the device (e.g., as reflected in a hardware profile), a time of day, previous actions performed by the user device 110, and/or an identity of the user 5 (e.g., as reflected in a user and/or group profile). The system 100 may have multiple mechanisms for determining an identity of a user 5 corresponding to an input. More specifically, the system 100 may determine a user and/or group profile corresponding to the input based on, for example, voice recognition, face recognition, biometric signals, radio frequency signals (e.g., received from another device on the user's person), etc. In some implementations, the system 100 may determine a user/group profile based on historic use; for example, based on a previously and/or recently received input(s), user 5 habits of use of the system 100, etc.

Some devices such as personal devices may be configured to support an explicitly selected user profile. An explicitly selected user profile may be a profile selected by a user as a default and/or preferred profile for the system to apply for user interactions with a user device 110 and/or a particular skill. "Explicitly selected user profile," "user selected profile," and "selected profile" are used interchangeably herein. An selected profile may represent, for example, a user device 110 being registered to a particular user 5, a user profile selected for a particular input/interaction (e.g., requesting media associated with a particular user's profile), a user profile selected for using a particular skill (e.g., having a media streaming device associated with one explicitly selected user profile, but having a second explicitly selected user profile associated with a particular content provider). In some cases, the system 100 may default to the selected profile if a user recognition confidence associated with an input received at the personal user device 110 is low. In some cases, the system 100 may use the selected profile for multi-turn interactions between user 5 and a particular endpoint. Some examples of user devices 110 that may be configured as personal devices may include a mobile phone, a smart speaker in a bedroom or home office, a vehicle, etc.

Other devices, such as a public device, may not be configured with (or not support) an explicitly selected user profile. Thus, if a user recognition confidence for a particular input is below a threshold level or score, the system 100 may not include a particular user/group profile in the context data for processing that input. In some cases, the system 100 may be configured with a default profile for handling such inputs. Some examples of user devices 110 that may be configured as public devices may include a smart speaker device in a hotel room or common area, a kiosk (e.g., in a shopping center or building open to the public) for shopping and/or information, a smart speaker with display in an office conference room, a user device in a common area of a family home, etc.

Whether a particular user device 110 is a personal device that is (or can be) configured with an explicitly selected user profile, or whether the particular user device 110 is a public device that is not (or cannot be) configured with an explicitly selected user profile, may not depend on the particular device type (e.g., model), but rather may depend on its configuration. Thus, many devices may be configured as either a personal device or a public device. Thus, in some cases, the distinction between a personal device and a public device may depend on whether the particular user device 110 is configured to handle a session context. In some implementations, the configuration may be permanent/semi-permanent in that a user device 110 configured not to support a session context cannot be reconfigured without an administrative override and/or factor reset. In some implementations, a user device 110 may be configured with/without session context by all users, a particular user, and/or a particular group of users.

A session context represents context data that can be used throughout a multi-turn interaction between a user 5 and a particular endpoint via a user device 110. If a user device 110 and/or an endpoint are configured to handle a session context, the system 100 may determine a session profile for handling multiple inputs of a multi-turn interaction. Examples of multi-turn interactions may, for example, playing a trivia game using a gaming skill, where the system 100 presents the user 5 with a series of questions and the user 5 responds with answers. Even if multiple users 5a, 5b, 5c, etc., are playing the game, and each user 5 input is associated with different user recognition data, the gaming skill component 190 may treat the game as a single interaction (e.g., "session"), and apply the same session context (e.g., including using the same user profile) throughout the game. In another example, various users 5a, 5b, 5c, etc., may request music to be output by the user device 110. If that user device 110 is configured to handle a session context, a music skill component 190 may treat each song request as part of the same multi-turn interaction, providing music from the same playlist and/or using the same user credentials, until a user 5 ends the interaction using a command or until some time has passed since the last request.

When handling inputs from a device configured to support a session context (e.g., a personal device), the skill may handle multiple inputs in an interaction (e.g., a "session") using the selected profile as the session context, even if the system recognizes a different user for one or more of inputs. Thus, if the system recognizes more than one user using a personal device during an interaction with the skill (e.g., playing a game or requesting music), the skill may handle each input of the interaction according to the selected profile rather than the user recognized for each input. For a device not configured to support a session person, however, (e.g., a communal device) the skill may handle each input according to the recognized profile regardless of an explicitly selected profile. In various implementations, however, the system 100 may apply different rules in different situations, as described further herein.

A session profile may be determined in various ways and based on various inputs. For example, the session context may include the explicitly selected profile as the session profile. In some cases, the session context may include a profile recognized based on the first input of an interaction— the recognized profile may be used as the session profile for the remainder of the interaction. In some implementations, the system 100 may provide an endpoint with various data that the endpoint may use to determine a session profile; for example, by using rules to determine a session profile for the session context based on various profile data such as user recognition data, selected profile data, historic profile data, etc. In some implementations, a component of the system 100 other than the endpoint (e.g., a session manager such as the session manager component 172 described herein) may implement logic and/or rules to determine a session profile for the session context.

FIG. 1 illustrates an example implementation of the system 100 in which the session manager component 172 collects and sends various data to the endpoint (the skill component 190) for determination of a session profile, if the user device 110 is configured to handle a session context. Example operations of such implementations are shown in the signal flow diagram of FIG. 3. In some implementations, the session manager component 172 may determine the session context itself and send the session context to the endpoint. Example operations of such implementations are shown in the signal flow diagram of FIG. 4.

The system 100 may receive identifying signals 116 and process them with a user recognition component 195 to determine user recognition data 197. The user recognition data 197 may indicate one or more user profiles corresponding to the identifying signals 116. In some implementations, a user profile indicated in the user recognition data 197 may include a confidence score; for example, a value representing a probability or likelihood that the identifying signals 116 correspond to a user profile. The user profiles may be stored in and retrieved from a profile storage component 170, described further below with reference to FIG. 2.

The system 100 may receive selected profile data 118. The selected profile data 118 may be received from a user 5 and may indicate a user profile that should be used for handling inputs received at the user device 110. If the user device 110 is configured with selected profile data 118, various endpoints may use the selected profile to process inputs from users 5 interacting with the user device 110, even if the user recognition data 197 indicates, with significant confidence, that a particular input is associated with a different user profile.

The session manager component 172 may include a profile context determination component (such as the context determination component 520 shown in FIG. 5) configured to receive the various data and apply rules and/or logic to make an input-level context decision (e.g., determining which profile to handle the particular input with), a session-level context decision (e.g., determining which profile to handle additional or all inputs corresponding to the session with), and/or a super-session-level context decision (e.g., determining which profile to handle all inputs from the user device 110 with). Additionally or alternatively, the session manager component 172 may send the various data to the skill component 190 for input and/or session context determination. In such cases, the skill component 190 may include a profile context determination component 520. The profile context determination component may include settings, rules, and/or other logic that determine a profile context for an input and/or a session. The session manager component 172 and/or the endpoint may make a context determination for a input and/or a session based on the user recognition data 197, the selected profile data 118, and/or historic profile data (e.g., one or more profiles associated with and/or determined for one or more previous inputs). The input and/or session context data 135 may be stored in (and retrieved from) a session storage component 130 used to maintain context of various multi-turn interactions occurring with the system 100. Thus, for a subsequent input, the system 100 may determine whether relevant input context data 135 exists for a previous input and/or whether the current input corresponds to an ongoing session having associated session context data 135. For a given context, the skill component 190 may retrieve profile data from the profile storage component 170 for handling an input.

Figure 2:
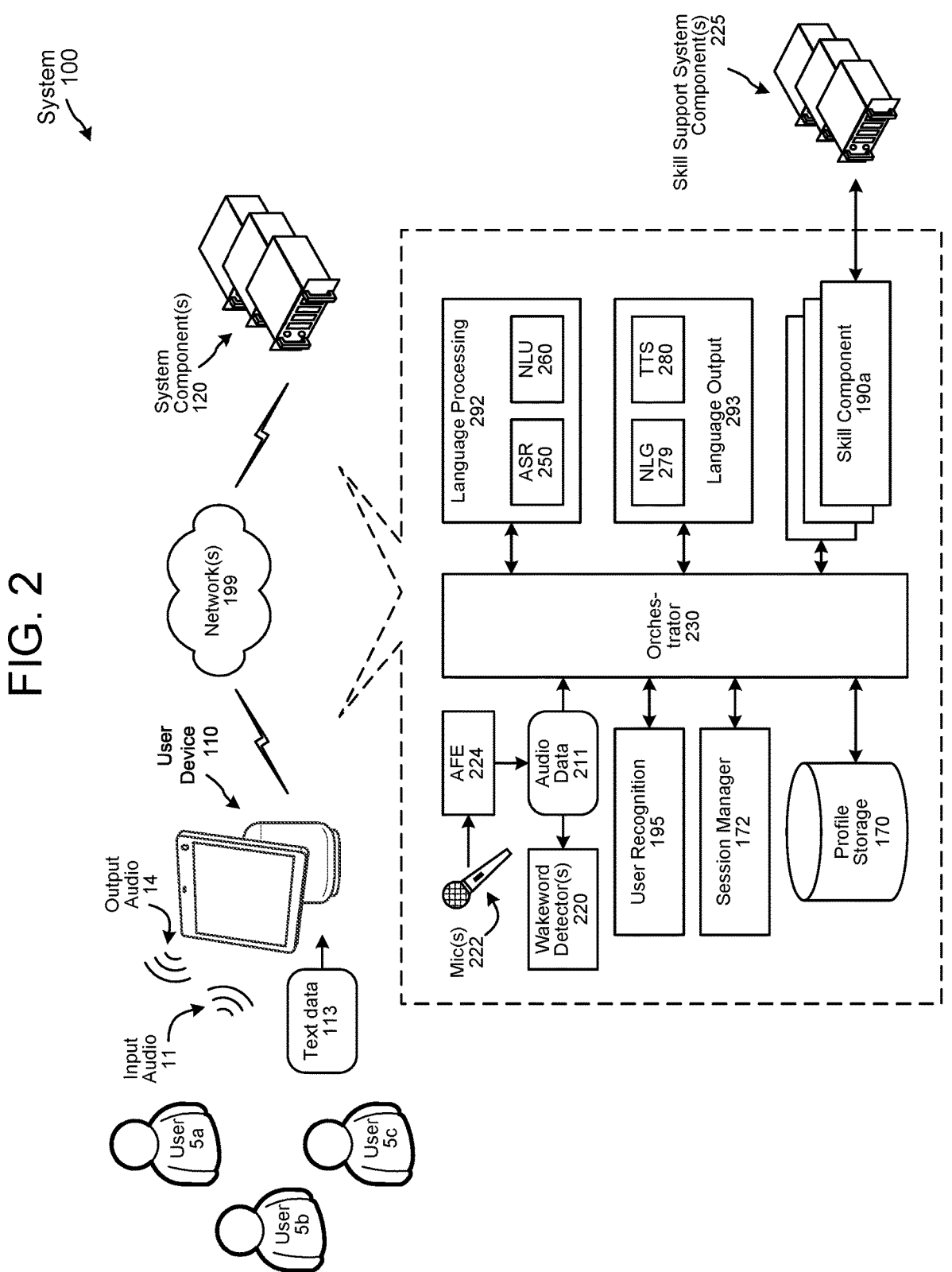
FIG. 2 is a conceptual diagram illustrating components of the speech processing system, according to embodiments of the present disclosure.

The system 100 includes various components for processing speech and/or other user inputs, generating synthesized speech responses, and performing other actions for and/or on behalf of the user. FIG. 2 is a conceptual diagram illustrating components of the system, according to embodiments of the present disclosure. The system 100 may operate using various components located on same or different physical devices (e.g., one or more user devices 110, system component(s) 120, and/or skill support system component(s) 225, etc.). In various implementations, the components may reside and/or execute on the user device 110, one or more system components 120, and/or divided or duplicated between various devices/components of the system 100. Communication between various components may occur directly or across a network(s) 199. The user device 110 may include audio capture component(s), such as a microphone 222 or array of microphones of a user device 110, captures audio 11 and creates corresponding audio data. An acoustic front end (AFE) 224 may process the audio signal using a number of techniques, such as determining frequency-domain audio data by using a transform such as a fast Fourier transform (FFT) and/or determining a Mel-cepstrum. The AFE 224 may output audio data 211, which may be or include acoustic feature data corresponding to a representation of the input audio 11. The AFE 224 may process the audio signal to create acoustic feature data, which may include one or more acoustic-feature vectors such as log filterbank energies (LFBE) vectors. Other types of feature vectors may be similarly created and used; for example, the feature vectors may include Mel-frequency cepstrum coefficients (MFCCs).

Once speech is detected in audio data representing the audio 11, the user device 110 may determine if the speech is directed at the user device 110/system component 120. In at least some embodiments, such determination may be made using a wakeword detection component 220. The wakeword detection component 220 may be configured to detect various wakewords. In at least some examples, each wakeword may correspond to a name of a different digital assistant. An example wakeword/digital assistant name is "Alexa." In another example, input to the system may be in form of text data 113, for example as a result of a user typing an input into a user interface of user device 110. Other input forms may include indication that the user has pressed a physical or virtual button on user device 110, the user has made a gesture, etc. The user device 110 may also capture images using camera(s) of the user device 110 and may send image data representing those image(s) to the system component 120. The image data may include raw image data or image data processed by the user device 110 before sending to the system component 120. The image data may be used in various manners by different components of the system to perform operations such as determining whether a user is directing an utterance to the system, interpreting a user input, responding to a user input, etc.

The wakeword detection component 220 of the user device 110 may process the audio data, representing the audio 11, to determine whether speech is represented therein. The user device 110 may use various techniques to determine whether the audio data includes speech. In some examples, the user device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110 may implement a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 220 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 220 and/or input is detected by an input detector, the user device 110 may "wake" and begin transmitting audio data 211, representing the audio 11, to the system component(s) 120. The audio data 211 may include data corresponding to the wakeword; in other embodiments, the portion of the audio corresponding to the wakeword is removed by the user device 110 prior to sending the audio data 211 to the system component(s) 120. In the case of touch input detection or gesture-based input detection, the audio data may not include a wakeword.

In some implementations, the system 100 may include more than one system components 120. The system components 120 may respond to different wakewords and/or perform different categories of tasks. Each system component 120 may be associated with its own wakeword such that speaking a certain wakeword results in audio data be sent to and processed by a particular system. For example, detection of the wakeword "Alexa" by the wakeword detection component 220 may result in sending audio data to system component 120a for processing while detection of the wakeword "Computer" by the wakeword detector may result in sending audio data to system component 120b for processing. The system may have a separate wakeword and system for different skills/systems (e.g., "Dungeon Master" for a game play skill/system component 120c) and/or such skills/systems may be coordinated by one or more skill component(s) 190 of one or more system components 120.

Upon receipt by the system component(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 may send the audio data 211 to language processing components 292. The language processing components 292 (sometimes also referred to as a spoken language understanding (SLU) component) includes an automatic speech recognition (ASR) component 250 and a natural language understanding (NLU) component 260. The ASR component 250 may transcribe the audio data 211 into text data. The text data output by the ASR component 250 represents one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., acoustic units such as phonemes, senons, phones, etc.) and sequences of sounds to identify words that match the sequence of sounds of the speech represented in the audio data 211. The ASR component 250 sends the text data generated thereby to an NLU component 260, via, in some embodiments, the orchestrator component 230. The text data sent from the ASR component 250 to the NLU component 260 may include a single top-scoring ASR hypothesis or may include an N-best list including multiple top-scoring ASR hypotheses. An N-best list may additionally include a respective score associated with each ASR hypothesis represented therein. The ASR component 250 is described in greater detail below with regard to FIG. 8.

The language processing components 292 may further include a NLU component 260. The NLU component 260 may receive the text data from the ASR component. The NLU component 260 may attempts to make a semantic interpretation of the phrase(s) or statement(s) represented in the text data input therein by determining one or more meanings associated with the phrase(s) or statement(s) represented in the text data. The NLU component 260 may determine an intent representing an action that a user desires be performed and may determine information that allows a device (e.g., the user device 110, the system component(s) 120, a skill component 190, a skill support system component(s) 225, etc.) to execute the intent. For example, if the text data corresponds to "play the 5th Symphony by Beethoven," the NLU component 260 may determine an intent that the system output music and may identify "Beethoven" as an artist/composer and "5th Symphony" as the piece of music to be played. For further example, if the text data corresponds to "what is the weather," the NLU component 260 may determine an intent that the system output weather information associated with a geographic location of the user device 110. In another example, if the text data corresponds to "turn off the lights," the NLU component 260 may determine an intent that the system turn off lights associated with the user device 110 or the user 5. However, if the NLU component 260 is unable to resolve the entity—for example, because the entity is referred to by anaphora such as "this song" or "my next appointment"—the language processing components 292 can send a decode request to another language processing components 292 for information regarding the entity mention and/or other context related to the utterance. The language processing components 292 may augment, correct, or base results data upon the audio data 211 as well as any data received from the other language processing components 292.

The NLU component 260 may return NLU results data 1085/1025 (which may include tagged text data, indicators of intent, etc.) back to the orchestrator component 230. The orchestrator component 230 may forward the NLU results data to a skill component(s) 190. If the NLU results data includes a single NLU hypothesis, the NLU component 260 and the orchestrator component 230 may direct the NLU results data to the skill component(s) 190 associated with the NLU hypothesis. If the NLU results data 1085/1025 includes an N-best list of NLU hypotheses, the NLU component 260 and the orchestrator component 230 may direct the top scoring NLU hypothesis to a skill component(s) 190 associated with the top scoring NLU hypothesis. The system may also include a post-NLU ranker which may incorporate other information to rank potential interpretations determined by the NLU component 260. The NLU component 260, post-NLU ranker 1065 and other components are described in greater detail below with regard to FIGS. 9 and 10.

A skill component may be software running on the system component(s) 120 that may function as or similar to a software application. That is, a skill component 190 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 190. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 190 may operate in conjunction between the system component(s) 120 and other devices, such as the user device 110, in order to complete certain functions. Inputs to a skill component 190 may come from speech processing interactions or through other interactions or input sources. A skill component 190 may include hardware, software, firmware, or the like that may be dedicated to a particular skill component 190 or shared among different skill components 190.

A skill support system component(s) 225 may communicate with a skill component(s) 190 within the system component(s) 120 and/or directly with the orchestrator component 230 or with other components. A skill support system component(s) 225 may be configured to perform one or more actions. An ability to perform such action(s) may sometimes be referred to as a "skill." That is, a skill may enable a skill support system component(s) 225 to execute specific functionality in order to provide data or perform some other action requested by a user. For example, a weather service skill may enable a skill support system component(s) 225 to provide weather information to the system component(s) 120, a car service skill may enable a skill support system component(s) 225 to book a trip with respect to a taxi or ride sharing service, an order pizza skill may enable a skill support system component(s) 225 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 190 dedicated to interacting with the skill support system component(s) 225. Unless expressly stated otherwise, reference to a skill, skill device, or skill component may include a skill component 190 operated by the system component(s) 120 and/or skill operated by the skill support system component(s) 225. Moreover, the functionality described herein as a skill or skill may be referred to using many different terms, such as an action, bot, app, or the like. The skill component 190 and or skill support system component(s) 225 may return output data to the orchestrator component 230.

The system component(s) 120 may include a user recognition component 195 that recognizes one or more users using a variety of data, as described in greater detail below with regard to FIGS. 6-7. The user recognition component 195 may take as input the audio data 211 and/or text data output by the ASR component 250. The user recognition component 195 may perform user recognition by comparing audio characteristics in the audio data 211 to stored audio characteristics of users. The user recognition component 195 may also perform user recognition by comparing biometric data (e.g., fingerprint data, iris data, etc.), received by the system in correlation with the present user input, to stored biometric data of users assuming user permission and previous authorization. The user recognition component 195 may further perform user recognition by comparing image data (e.g., including a representation of at least a feature of a user), received by the system in correlation with the present user input, with stored image data including representations of features of different users. The user recognition component 195 may perform additional user recognition processes, including those known in the art.

The user recognition component 195 determines scores indicating whether user input originated from a particular user. For example, a first score may indicate a likelihood that the user input originated from a first user, a second score may indicate a likelihood that the user input originated from a second user, etc. The user recognition component 195 also determines an overall confidence regarding the accuracy of user recognition operations.

Output of the user recognition component 195 may include a single user identifier corresponding to the most likely user that originated the user input. Alternatively, output of the user recognition component 195 may include an N-best list of user identifiers with respective scores indicating likelihoods of respective users originating the user input. The output of the user recognition component 195 may be used to inform NLU processing as well as processing performed by other components of the system.

The user recognition data 197 may be used by, for example, the session manager component 172 and/or skill component(s) 190 to determine which profile data, if any, to use when handing user inputs. Such profile data may include user-specific preferences, libraries, input history, login credentials, payment information, and the like. Profile data for users, groups, and/or devices may be stored in the profile storage component 170. The profile data may include various data such as user/group/device settings, configurations, or state information; personal data such as email account info, phone numbers, payment accounts; general information such as hobbies, diet, organization memberships; and/or media libraries such as music, movies, tv shows, etc. The profile data may be used for user recognition, processing inputs (e.g., intent classification, entity resolution, etc.), and/or skill processing of inputs, etc.

The system 100 (either on user device 110, system component 120, skill component 190, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information. Profiles may correspond to one or more users 5, groups of users 5 (e.g., a family or other cohort), and/or user devices 110 (e.g., a device profile, hardware profile, configuration data, device-specific preferences, etc.). For example, the profile storage component 170 may include data regarding whether a particular user device 110 is or has been configured to support session context. The profile storage component 170 may also include data regarding whether a user profile has been explicitly selected for a personal device, and which profile has been selected.

The profile storage component 170 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 110, the user profile (associated with the presented login information) may be updated to include information about the user device 110, for example with an indication that the device is currently in use. Each user profile may include identifiers of skills that the user has enabled. When a user enables a skill, the user is providing the system component 120 with permission to allow the skill to execute with respect to the user's natural language user inputs. If a user does not enable a skill, the system component 120 may not invoke the skill to execute with respect to the user's natural language user inputs.

The profile storage component 170 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage component 170 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system(s) 100 may include a session manager component 172 that manages and/or tracks a session (sometimes called a dialog) between one or more users 5, one or more user devices 110, and/or one or more skill components 190. Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn, "goal-oriented" dialog systems typically need to recognize, retain, and use information collected during more than one input during a back-and-forth or "multi-turn" interaction with the user. As used herein, a dialog may be referred to as an "interaction" and/or a "session" (e.g., possibly corresponding to a session context). In some cases, a dialog may refer to interactions between a user 5 (e.g., and/or multiple users 5 via a particular user device 110) and multiple skills and/or applications, where the multiple turns may be related in some way (e.g., streaming media about a product from a first skill and then purchasing the product using a second skill). In some cases, a session may refer to interactions between a user 5 or users 5 and a single skill and/or application (e.g., answering a series of questions in a trivia game hosted by a gaming skill).

In some implementations, the session manager component 172 may apply rules to determine profile data for handling user inputs; for example, as previously described with reference to FIG. 4. The session manager component 172 may determine profile data based on various user profiles corresponding to (and/or determined for) a given input based on priorities. The priorities may depend on whether a user device 110 that received the input is a personal (e.g., private or semi-private) or public device, and/or whether it can support or has been configured to support session context. Similarly, the priorities may also depend on whether a skill (or skill component 190) invoked by the input supports or has been configured to support session context. In some implementations, similar rules/logic may be applied by one or more skill components 190 of the system 100; for example, as previously described with reference to FIG. 3.

The session manager component 172 may manage and/or track a session between a user and a device. As used herein, a "session" may refer to data transmissions (such as relating to multiple user inputs and system 100 outputs) between the system 100 and a user (e.g., through user device(s) 110) that all relate to a single "conversation" between the system and the user that may have originated with a single user input initiating the session. Thus, the data transmissions of a session may be associated with a same session identifier, which may be used by components of the overall system 100 to track information across the session. Subsequent user inputs of the same session may or may not start with speaking of a wakeword. Each natural language input of a session may be associated with a different natural language input identifier such that multiple natural language input identifiers may be associated with a single session identifier. Further, other non-natural language inputs (e.g., image data, gestures, button presses, etc.) may relate to a particular session depending on the context of the inputs. For example, a user may open a session with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the session and the data associated therewith may be associated with the session identifier of the session.

The session manager component 172 may associate a session identifier with the session upon identifying that the user is engaging in a session with the user. The session manager component 172 may track a user input and the corresponding system generated response to the user input as a turn. The session identifier may correspond to multiple turns of user input and corresponding system generated response. The session manager component 172 may transmit data identified by the session identifier directly to the orchestrator component 230 or other component. Depending on system configuration the session manager component 172 may determine the appropriate system generated response to give to a particular utterance or user input of a turn. Or creation of the system generated response may be managed by another component of the system (e.g., the language output components 293, NLG component 279, orchestrator component 230, etc.) while the session manager component 172 selects the appropriate responses. Alternatively, another component of the system component(s) 120 may select responses using techniques discussed herein. The text of a system generated response may be sent to a TTS component for creation of audio data corresponding to the response. The audio data may then be sent to a user device (e.g., user device 110) for ultimate output to the user. Alternatively (or in addition) a response may be returned in text or some other form.

The system component 120 includes language output components 293. The language output components 293 includes a natural language generation (NLG) component 279 and a text-to-speech (TTS) component 280. The NLG component 279 can generate text for purposes of TTS output to a user. For example, the NLG component 279 may generate text corresponding to instructions corresponding to a particular action for the user to perform. The NLG component 279 may generate appropriate text for various outputs as described herein. The NLG component 279 may include one or more trained models configured to output text appropriate for a particular input. The text output by the NLG component 279 may become input for the TTS component 280 (e.g., output text data 1115 discussed below). Alternatively or in addition, the TTS component 280 may receive text data from a skill component 190 or other system component for output.

The NLG component 279 may include a trained model. The NLG component 279 may generate text data 1115 from dialog data received from, for example, a skill component

190, the session manager component 172, and/or other component(s) of the system 100 such that the output text data 1115 has a natural feel and, in some embodiments, includes words and/or phrases specifically formatted for a user profile associated with the input/session context data 135. The NLG may use templates to formulate responses. And/or the NLG system may include models trained from the various templates for forming the output text data 1115. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or an input history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 280.

The TTS component 280 may generate audio data (e.g., synthesized speech) from text data using one or more different methods. Text data input to the TTS component 280 may come from a skill component 190, the orchestrator component 230, or another component of the system. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The user device 110 may include still image and/or video capture components such as a camera or cameras to capture one or more images. The user device 110 may include circuitry for digitizing the images and/or video for transmission to the system component(s) 120 as image data. The user device 110 may further include circuitry for voice input-based control of the camera, allowing a user 5 to request capture of image or video data. The user device 110 may process the inputs locally or send audio data 211 representing the inputs to the system component(s) 120 for processing, after which the system component(s) 120 may return output data that can cause the user device 110 to engage its camera.

Figure 3:
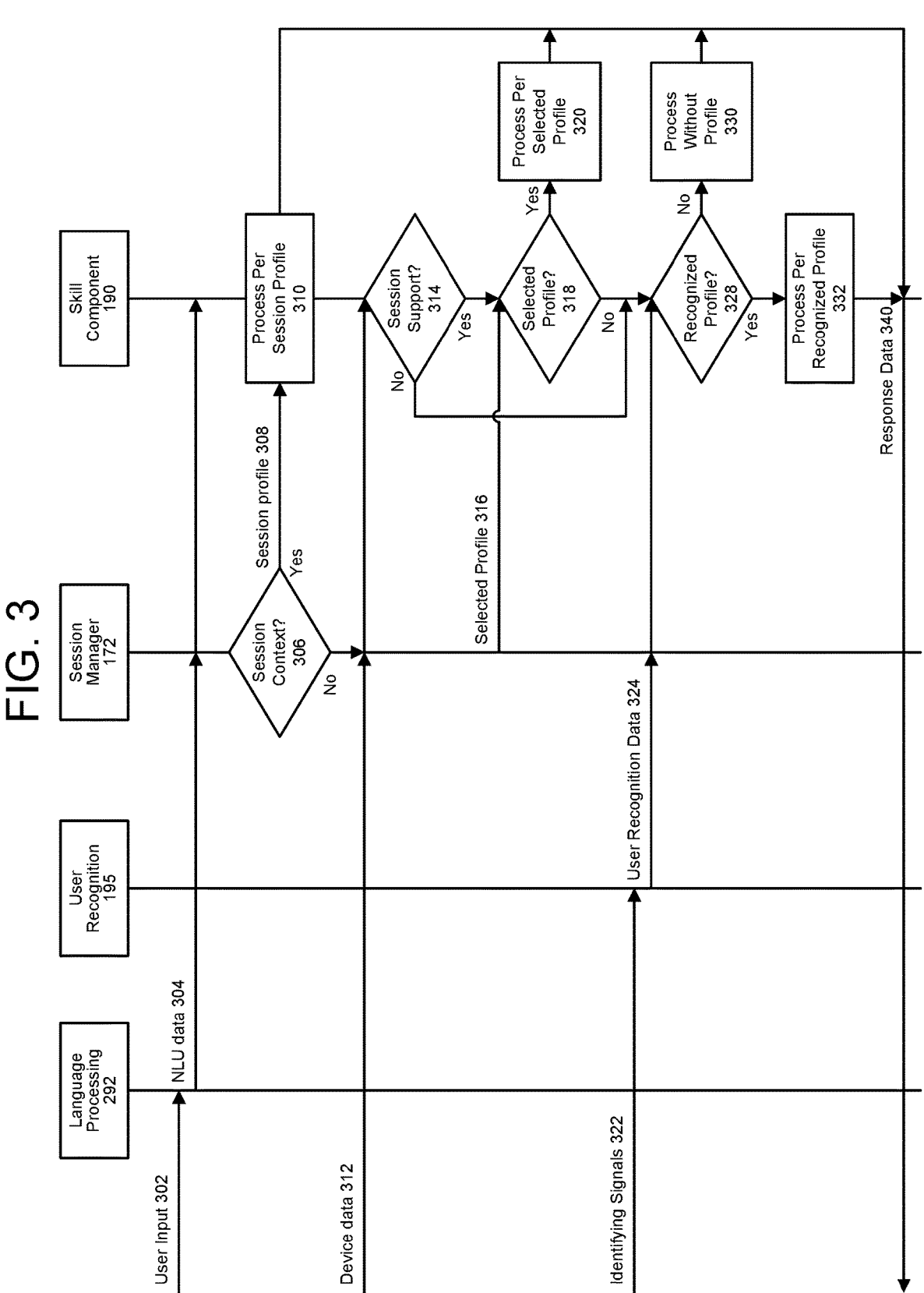
FIG. 3 is a signal flow diagram illustrating first example operations of processing a user input using a determined profile context, according to embodiments of the present disclosure.

FIG. 3 is a signal flow diagram illustrating first example operations of processing a user input using a determined profile context, according to embodiments of the present disclosure. The operations may include determining the profile context by the session manager component 172 and/or the skill component 190. In the example operations shown in FIG. 3, the session manager component 172 (e.g., a profile context determination component 520a of the session manager component 172) may determine whether a session context exists for a received input and, if so, provides the session context including a session profile to the endpoint. If the session manager component 172 determines that no session context currently exists, the session manager component 172 may send various other data (e.g., device data, selected profile data, user recognition data, etc.) to enable the endpoint to make an input and/or session context determination.

The operations may include receiving inputs at a user device 110 (e.g., a user input 302, identifying signals 322, device data 312, etc.) and providing outputs from the same and/or different user device 110 (e.g., response data 340). Functions of the language processing components 292, user recognition component 195, session manager component 172, and/or skill component 190, etc., may be performed by the user device 110 and/or one or more system components 120. Although the order of operations is shown in a particular order, in various implementations the operations may occur in different orders and/or include more, fewer, or different operations.

A user may provide a user input 302 to the system 100, which may process the user input 302 using the language processing components 292. The language processing components 292 (e.g., the ASR component 250 and/or the NLU component 260) may process the user input 302 to determine NLU data 304, which may include an intent and/or entity determined from the user input 302. The language processing components 292 may send the NLU data 304 (e.g., via the orchestrator component 230, which may additionally determine which skill component 190 to send the NLU data 304 to) to the session manager component 172 and/or the skill component 190. The session manager component 172 may, at 306, determine whether the NLU data 304 represents an input that corresponds to a session context (e.g., as stored in the session storage component 130). If the input corresponds to a session context (e.g., the input is part of a multi-turn interaction for which a context profile has already been determined ("yes" at 306), the session manager component 172 may send the session profile data 308 to the skill component 190, which may then, at 310, process the NLU data 304 according to the session profile data 308. The skill component 190 may generate response data 340, which may then be output by the same and/or different user device 110.

If the session manager component 172 determines that the input does not correspond to an existing session context ("no" at 306), the session manager component 172 and/or the skill component 190 may receive device data 312 from the user device 110 and/or another source (e.g., such as the profile storage component 170, etc.). The skill component 190 (e.g., a profile context determination component 520b of the skill component 190) may, at 314, determine whether the user device 110 supports a session context. If the user device 110 does support a session context ("yes" at 314), the skill component 190 may, at 318, determine whether an explicitly selected profile has been configured for the user device 110. If the user device 110 has been configured to have an explicitly selected profile ("yes" at 318), the skill component 190 may receive the selected profile data 316 (e.g., from the session manager component 172, but possibly the profile storage component 170 and/or the user device 110 itself), and use the selected profile data 318 to, at 320, process the NLU data 304 to generate the response data 340.

If, however, the skill component 190 determines that the user device 110 has not been configured with a selected profile ("no" at 318) the skill component 190 may, at 328, determine whether the system 100 has identified a user profile corresponding to the input. For example, the user recognition component 195 may receive one or more identifying signals 322 from the user device 110 and process the identifying signals 322 to generate user recognition data 324. The user recognition component 195 may send the user recognition data 324 to the session manager component 172 and/or the skill component 190. If the system 100 identifies a valid profile ("yes" at 328)—for example, by determining that the user recognition data 324 corresponds to a known user/group/etc. profile and indicates a level of confidence that meets a condition (e.g., exceeds a threshold value)—the skill component 190 may determine to process, at 332, the NLU data 304 using the recognized profile to generate the response data 340. If the system 100 does not identify a valid profile ("no" at 328) the skill component 190 may, at 330, process the NLU data 304 using a default profile or no profile to generate the response data 340.

The system may repeat some or all of these operations for additional inputs. Depending on various rules and/or logic implemented by the session manager component 172 and/or the skill component 190, the system 100 may handle subsequent inputs according to the session profile and/or selected profile data, even if user recognition indicates that an input originated from a different user. In some cases, no selected profile may yet be configured for the user device 110, even though the user device 110 and/or the skill component 190 support a session context and/or an explicitly selected profile. In such cases, the session manager component 172 and/or the skill component 190 may use the recognized profile determined for the first input of the interaction as the session profile for the interaction.

In some cases, the system 100 (e.g., either the session manager component 172 or other component) may implement guardrails, safeguards, feedback, etc. to ensure skill components 190 make appropriate profile context determinations. For example, the session manager component 172 may enforce user settings that may, in some circumstances, be used to override profile context determinations made by a skill component 190; and, in extreme circumstances, interrupt a session to prevent a poor customer experience. For example, the session manager component 172 may prevent a skill component 190 from repeatedly defaulting to a selected profile in the face of contrary user recognition data from a user device 110 configured not to support a session context. In another example, the session manager component 172 may prevent a skill component 190 from repeatedly applying a recognized profile when both the skill component 190 itself and user device 110 are configured to support a session context. Other policies may be imposed by the system 100 and/or by individual users 5 without departing from the scope of the disclosure.

Figure 4:
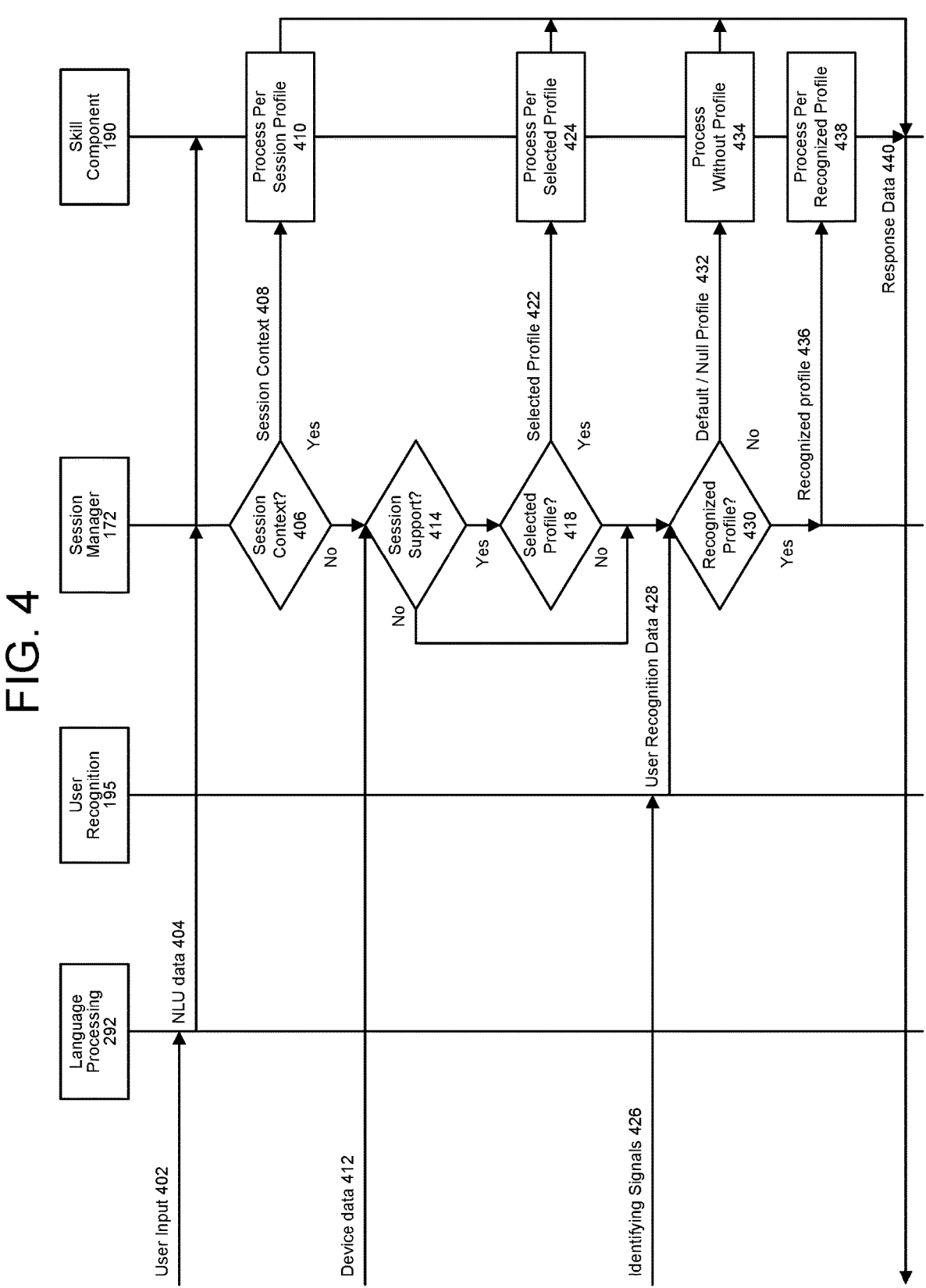
FIG. 4 is a signal flow diagram illustrating first example operations of processing a user input using a determined profile context, according to embodiments of the present disclosure.

FIG. 4 is a signal flow diagram illustrating first example operations of processing a user input using a determined profile context, according to embodiments of the present disclosure. The operations may include determining the profile context by the session manager component 172. In the example operations shown in FIG. 4, the session manager component 172 may determine whether a session context exists for a received input and, if so, provides the session context including a session profile to the endpoint. If the session manager component 172 determines that no session context currently exists, the session manager component 172 may determine an input and/or session context based on various other data (e.g., device data, selected profile data, user recognition data, etc.). The session manager component 172 may provide the input/session context to the endpoint.

The operations may include receiving inputs at a user device 110 (e.g., a user input 402, identifying signals 426, device data 412, etc.) and providing outputs from the same and/or different user device 110 (e.g., response data 440). Functions of the language processing components 292, user recognition component 195, session manager component 172, and/or skill component 190, etc., may be performed by the user device 110 and/or one or more system components 120. Although the order of operations is shown in a particular order, in various implementations the operations may occur in different orders and/or include more, fewer, or different operations.

A user may provide a user input 402 to the system 100, which may process the user input 402 using the language processing components 292. The language processing components 292 (e.g., the ASR component 250 and/or the NLU component 260) may process the user input 402 to determine NLU data 404, which may include an intent and/or entity determined from the user input 402. The language processing components 292 may send the NLU data 404 (e.g., via the orchestrator component 230, which may additionally determine which skill component 190 to send the NLU data 404 to) to the session manager component 172 and/or the skill component 190. The session manager component 172 (e.g., a profile context determination component 520a of the session manager component 172) may, at 406, determine whether the NLU data 404 represents an input that corresponds to a session context (e.g., as stored in the session storage component 130). If the input corresponds to a session context (e.g., the input is part of a multi-turn interaction for which a context profile has already been determined ("yes" at 406), the session manager component 172 may send the session profile data 408 to the skill component 190, which may then, at 410, process the NLU data 404 according to the session profile data 408. The skill component 190 may generate response data 440, which may then be output by the same and/or different user device 110.

If the session manager component 172 determines that the input does not correspond to an existing session context ("no" at 406), the session manager component 172 may receive device data 412 from the user device 110 and/or another source (e.g., such as the profile storage component 170, etc.). The session manager component 172 may, at 414, determine whether the user device 110 supports a session context. If the user device 110 does support a session context ("yes" at 414), the session manager component 172 may, at 418, determine whether an explicitly selected profile has been configured for the user device 110. If the user device 110 has been configured to have an explicitly selected profile ("yes" at 418), the session manager component 172 may send the selected profile data 422 to the skill component 190. The skill component 190 may use the selected profile data 422 when processing, at 424, the NLU data 404 to generate the response data 440.

If, however, the session manager component 172 determines that the user device 110 has not been configured with a selected profile ("no" at 418) the session manager component 172 may, at 430, determine whether the system 100 has identified a user profile corresponding to the input. For example, the user recognition component 195 may receive one or more identifying signals 426 from the user device 110 and process the identifying signals 426 to generate user recognition data 428. The user recognition component 195 may send the user recognition data 428 to the session manager component 172. If the system 100 identifies a valid profile ("yes" at 430)—for example, by determining that the user recognition data 428 corresponds to a known user/group/etc. profile and indicates a level of confidence that meets a condition (e.g., exceeds a threshold value)—the session manager component 172 may send the recognized profile data 436 to the skill component 190. The skill component 190 may, at 438, process the NLU data 404 using the recognized profile data 436 to generate the response data 440. If the system 100 does not identify a valid profile ("no" at 430) the session manager component 172 may send default profile data or no profile data to the skill component 190, or otherwise instruct the skill component 190 to, at 434, process the NLU data 404 using default/null profile data 432 to generate the response data 440.

The system may repeat some or all of these operations for additional inputs. Depending on various rules and/or logic implemented by the session manager component 172 and/or the skill component 190, the system 100 may handle subsequent inputs according to the session profile and/or selected profile data, even if user recognition indicates that an input originated from a different user. In some cases, no selected profile may yet be configured for the user device 110, even though the user device 110 and/or the skill component 190 support a session context and/or an explicitly selected profile. In such cases, the session manager component 172 may use the recognized profile determined for the first input of the interaction as the session profile for the interaction.

Figure 5:
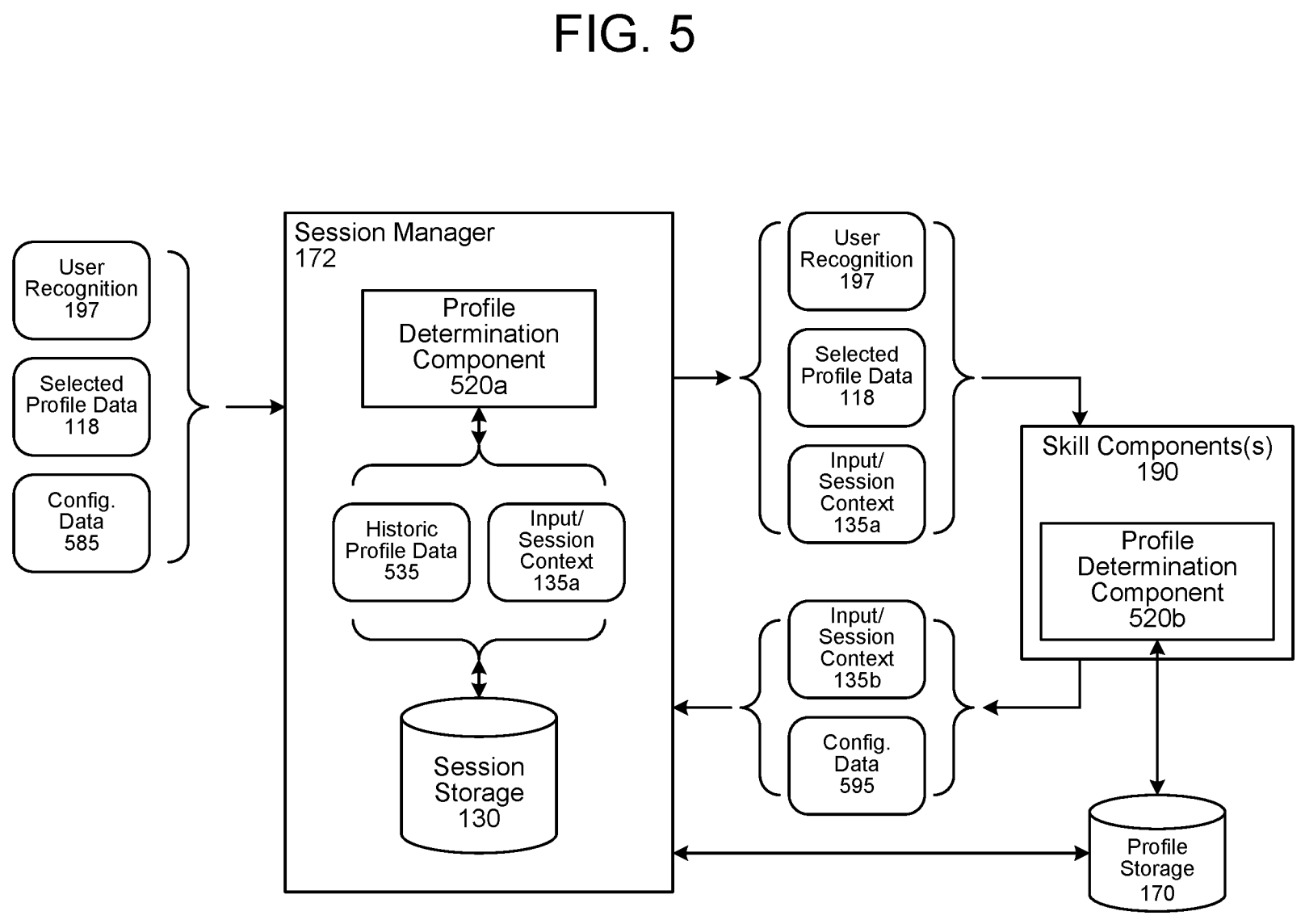

FIG. 5 illustrate operations related to determining profile contexts and collecting and disseminating data to facilitate skill component 190 profile context determinations. The session manager component 172 may receive selected profile data 118, user recognition data 197, configuration data 595 regarding skill component 190 configuration (e.g., whether or not a particular skill supports session context), and/or user device 110 configuration data 585 (e.g., whether or not a particular user device 110 is configured as a personal or public device). The session manager component 172 may include (or interface with) a session storage component 130 configured to store and retrieve historic profile context data 535 (e.g., representing previous profile context determinations) and/or input/session context data 135 for the current input/session. The session manager component 172 may also receive various data from a skill component 190 including configuration data 595 for the skill component 190 (e.g., whether or not the skill component 190 is configured to support session context) and/or input/session context data 135b determined by the skill component 190 for the current input/session. The session manager component 172 may provide various data to the skill component 190 including the user recognition data 197, the selected profile data 118, and/or input/session context data 135a determined by the session manager component 172 for the current input/session. The session manager component 172 and/or the skill component(s) 190 may retrieve profile data (e.g., data used for handling a user input) from the profile storage component 170. The profile data may include various data such as user/group/device settings, configurations, or state information; personal data such as email account info, phone numbers, payment accounts; general information such as hobbies, diet, organization memberships; and/or media libraries such as music, movies, tv shows, etc. The profile data may be used for user recognition, processing inputs (e.g., intent classification, entity resolution, etc.), and/or skill processing of inputs, etc.

In some implementations, the session manager component 172 may include a profile context determination component 520a configured to apply rules, logic, user settings, and/or skill settings to determine profile data for handling user inputs; for example, as previously described with reference to FIG. 4. In some implementations, the skill component 190 may include a profile context determination component 520b configured to perform the same or similar operations as the profile context determination component 520a and as previously described with reference to FIG. 3. The profile context determination component 520a and profile context determination component 520b may be referred to collectively and/or individually herein as a profile context determination component 520. The profile context determination component 520a may determine profile data based on various user profiles corresponding to (and/or determined for) a given input based on priorities. The priorities may depend on whether a user device 110 that received the input is a personal (e.g., private or semi-private) or public device, and/or whether it can support or has been configured to support session context. Similarly, the priorities may also depend on whether a skill (or skill component 190) invoked by the input supports or has been configured to support session context.

In some implementations, a profile context determination component 520 may determine whether an input pertains to an active session or dialog. If so, the profile context determination component 520 may cause the skill component 190 (or other invoked application, etc.) to handle the input according to a user profile indicated in the session context for the active session. If there is no active session, the profile context determination component 520 may determine whether the user device 110 and/or skill component 190 is configured to support session context. If the user device 110 and/or skill component 190 is configured to support session context, the profile context determination component 520 may determine whether the user device 110 is configured with a selected profile. If so, the profile context determination component 520 may cause the skill component 190 to handle the input according to the explicitly selected profile. If the user device 110 is not configured with a selected profile, the profile context determination component 520 may cause the skill component 190 to handle the input according to the recognized profile; for example, a user profile indicated in the user recognition data 197.

In some implementations, the profile context determination component 520 may, in some situations, apply thresholding or other conditions to the user recognition data 197. For example, for an input not pertaining to an active session, the profile context determination component 520 may determine whether a confidence score (e.g., a value indicating a likelihood that the input corresponds to a particular profile) associated with the user recognition data 197 satisfies a condition. If the value of the confidence score does not satisfy a condition (e.g., fails to meet or exceed a threshold value), the profile context determination component 520 may initiate a session according to the selected profile rather than a user profile indicated in the user recognition data 197. If, however, the confidence score satisfies the conditions (e.g., meets or exceeds the threshold value), the profile context determination component 520 may initiate a session according to the user profile indicated in the user recognition data 197.

In another example, if the system 100 receives an input from a user device 110 that does not support session context (and/or the input invokes a skill component 190 that does not support session context) and the input does not correspond to an active session, the profile context determination component 520 may determine, based on the confidence score associated with a profile identified for the input, whether to use the identified profile as the input and/or session context data 135. If the confidence is relatively low, however, the profile context determination component 520 may select a null profile or no profile for handling the input.

If the system 100 receives an input that is part of an active session from a user device 110 that does support session context (and/or the input invokes a skill component 190 that also supports session context), the profile context determination component 520 may determine whether or not to use the input/session context data 135 based on a confidence score associated with the user recognition data 197. If the confidence is high, the session manager component 172 may cause the skill component 190 to use the recognized profile. If the confidence is low, however, the profile context determination component 520 may cause the skill component 190 to use the profile indicated in the input/session context data 135. Additional and/or alternative rules may be implemented without departing from the scope of the disclosure.

In some implementations, similar rules/logic may be applied by one or more skill components 190 of the system 100; for example, as previously described with reference to FIG. 3. For example, the session manager component 172 component may send various data to a skill component 190; for example, the selected profile data 118, user recognition data 197, and/or user device 110 configuration. A profile context determination component 520b of the skill component 190 may process the data to determine an input and/or session context data 135. In some implementations, the skill component 190 may additionally process historic profile data (e.g., input and/or session context data 135 determined for a previous input). The skill component 190 may handle the user input according to a profile identified by the determined the input/session context data 135. If the skill component 190 makes an input/session context data 135 determination (e.g., by identifying a user profile for handling the input and/or session), the skill component 190 may send the input/session context data 135b back to the session manager component 172 for storage and/or use in making context determinations for subsequent inputs.

In some embodiments, the system component(s) 120 may determine past interaction data, such as a satisfaction rating corresponding to skill component(s) 190 and store it in the session storage component 130. The satisfaction rating may be based on past interactions between users of the system component(s) 120 and the skill. In some embodiments, the system component(s) 120 may determine a user-specific satisfaction rating corresponding to the skill based on user-specific data, interaction-specific data and/or focus data, such as, profile data (e.g., as stored in and/or retrieved from the profile storage component 170) associated with the specific user, location data, past user interactions with the system component(s) 120, past user interactions with the skill component 190, user preferences, device type for the user device 110 that received the user input, device type for the user device 110 that may output/respond to the user input, device capabilities, session state of previous turns in the session, and other data.

In some embodiments, users may provide feedback to the system component(s) 120 or the skill support system component(s) 225 indicating the user's satisfaction in the service skill responding to the user input/performing an action in response to the user input. The feedback may be solicited by the system component(s) 120 or the skill support system component(s) 225. In some cases, the feedback may be explicit feedback and may be received as a voice input, text input, gestures, or other types of input. In other cases, the feedback may be implicit feedback and may be determined by processing data related to the user interaction, such as, image data representing the user's facial expression, audio data (representing an utterance from the user) indicating a sentiment/emotion of the user, text data (representing the user input) indicating a sentiment of the user, other sounds/speech indicating the user's emotions/feelings/sentiment (e.g., "ugh" indicating frustration), and other types of data.

The user device 110 and/or the system component(s) 120 may include a user recognition component 195 that recognizes one or more users using a variety of data. The user recognition component 195 may process the various data to determine user recognition data 197. The user recognition data 197 may be used by, for example, the session manager component 172 and/or skill component(s) 190 to determine which profile data, if any, to use when handing user inputs. Such profile data may include user-specific preferences, libraries, input history, login credentials, payment information, and the like. Profile data for users, groups, and/or devices may be stored in the profile storage component 170.

Figure 6:
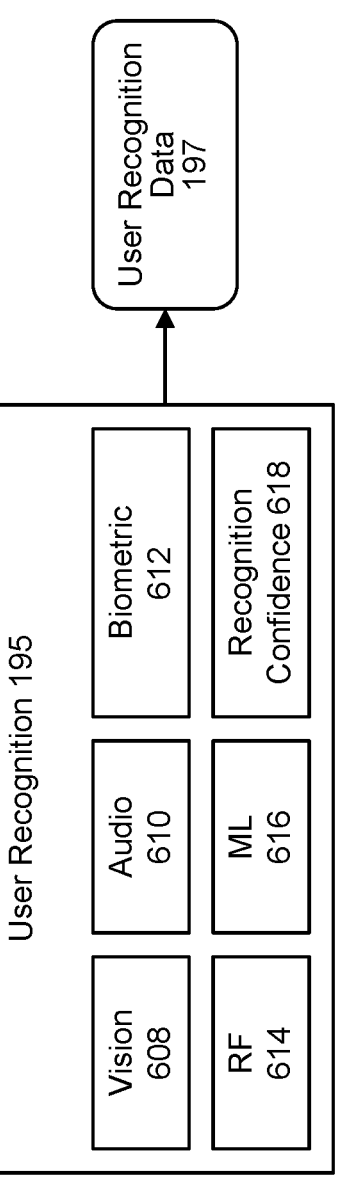
FIG. 6 is a schematic diagram of an illustrative architecture in which sensor data is combined to recognize one or more users according to embodiments of the present disclosure.

As illustrated in FIG. 6, the user recognition component 195 may include one or more subcomponents including a vision component 608, an audio component 610, a biometric component 612, a radio frequency (RF) component 614, a machine learning (ML) component 616, and a recognition confidence component 618. In some instances, the user recognition component 195 may monitor data and determinations from one or more subcomponents to determine an identity of one or more users associated with data input to the user device 110 and/or the system component(s) 120. The user recognition component 195 may output user recognition data 197, which may include a user identifier associated with a user the user recognition component 195 determines originated data input to the user device 110 and/or the system component(s) 120. The user recognition data 197 may be used to inform processes performed by various components of the user device 110 and/or the system component(s) 120.

The vision component 608 may receive data from one or more sensors capable of providing images (e.g., cameras) or sensors indicating motion (e.g., motion sensors). The vision component 608 can perform facial recognition or image analysis to determine an identity of a user and to associate that identity with a user profile associated with the user. In some instances, when a user is facing a camera, the vision component 608 may perform facial recognition and identify the user with a high degree of confidence. In other instances, the vision component 608 may have a low degree of confidence of an identity of a user, and the user recognition component 195 may utilize determinations from additional components to determine an identity of a user. The vision component 608 can be used in conjunction with other components to determine an identity of a user. For example, the user recognition component 195 may use data from the vision component 608 with data from the audio component 610 to identify what user's face appears to be speaking at the same time audio is captured by a user device 110 the user is facing for purposes of identifying a user who spoke an input to the user device 110 and/or the system component(s) 120.

The overall system of the present disclosure may include biometric sensors that transmit data to the biometric component 612. For example, the biometric component 612 may receive data corresponding to fingerprints, iris or retina scans, thermal scans, weights of users, a size of a user, pressure (e.g., within floor sensors), etc., and may determine a biometric profile corresponding to a user. The biometric component 612 may distinguish between a user and sound from a television, for example. Thus, the biometric component 612 may incorporate biometric information into a confidence level for determining an identity of a user. Biometric information output by the biometric component 612 can be associated with specific user profile data such that the biometric information uniquely identifies a user profile of a user.

The radio frequency (RF) component 614 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 614 the strength of the signal (e.g., as a received signal strength indication (RSSI)). The RF component 614 may use the RSSI to determine an identity of a user (with an associated confidence level). In some instances, the RF component 614 may determine that a received RF signal is associated with a mobile device that is associated with a particular user identifier.

In some instances, a personal device (such as a phone, tablet, wearable or other device) may include some RF or other detection processing capabilities so that a user who speaks an input may scan, tap, or otherwise acknowledge his/her personal device to the user device 110. In this manner, the user may "register" with the system 100 for purposes of the system 100 determining who spoke a particular input. Such a registration may occur prior to, during, or after speaking of an input.

The ML component 616 may track the behavior of various users as a factor in determining a confidence level of the identity of the user. By way of example, a user may adhere to a regular schedule such that the user is at a first location during the day (e.g., at work or at school). In this example, the ML component 616 would factor in past behavior and/or trends in determining the identity of the user that provided input to the user device 110 and/or the system component(s) 120. Thus, the ML component 616 may use historical data and/or usage patterns over time to increase or decrease a confidence level of an identity of a user.

In at least some instances, the recognition confidence component 618 receives determinations from the various components 608, 610, 612, 614, and 616, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level required for a user input associated with playing a playlist or sending a message. The confidence level or other score data may be included in the user recognition data 197.

The audio component 610 may receive data from one or more sensors capable of providing an audio signal (e.g., one or more microphones) to facilitate recognition of a user. The audio component 610 may perform audio recognition on an audio signal to determine an identity of the user and associated user identifier. In some instances, aspects of user device 110 and/or the system component(s) 120 may be configured at a computing device (e.g., a local server). Thus, in some instances, the audio component 610 operating on a computing device may analyze all sound to facilitate recognition of a user. In some instances, the audio component 610 may perform voice recognition to determine an identity of a user.

The audio component 610 may also perform user identification based on audio data 211 input into the user device 110 and/or the system component(s) 120 for speech processing. The audio component 610 may determine scores indicating whether speech in the audio data 211 originated from particular users. For example, a first score may indicate a likelihood that speech in the audio data 211 originated from a first user associated with a first user identifier, a second score may indicate a likelihood that speech in the audio data 211 originated from a second user associated with a second user identifier, etc. The audio component 610 may perform user recognition by comparing speech characteristics represented in the audio data 211 to stored speech characteristics of users (e.g., stored voice profiles associated with the user device 110 that captured the spoken user input).

Figure 7:
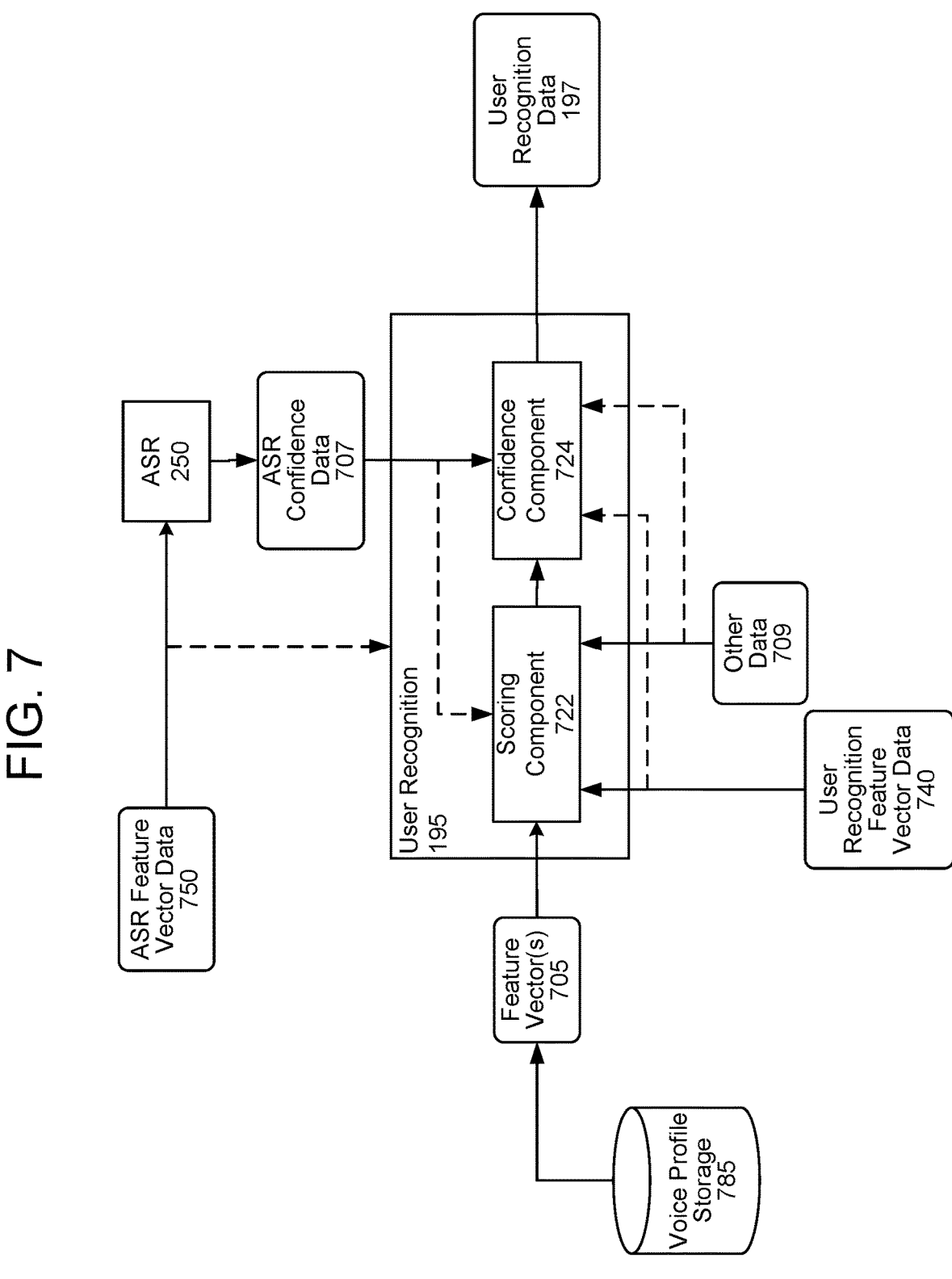
FIG. 7 is a system flow diagram illustrating user recognition according to embodiments of the present disclosure.

FIG. 7 illustrates user recognition processing as may be performed by the user recognition component 195. The ASR component 250 performs ASR processing on ASR feature vector data 750. ASR confidence data 707 may be passed to the user recognition component 195.

The user recognition component 195 performs user recognition using various data including the user recognition feature vector data 740, feature vectors 705 representing voice profiles of users of the system 100, the ASR confidence data 707, and other data 709. The user recognition component 195 may output the user recognition data 197, which reflects a certain confidence that the user input was spoken by one or more particular users. The user recognition data 197 may include one or more user identifiers (e.g., corresponding to one or more voice profiles). Each user identifier in the user recognition data 197 may be associated with a respective confidence value, representing a likelihood that the user input corresponds to the user identifier. A confidence value may be a numeric or binned value.

The feature vector(s) 705 input to the user recognition component 195 may correspond to one or more voice profiles. The user recognition component 195 may use the feature vector(s) 705 to compare against the user recognition feature vector 740, representing the present user input, to determine whether the user recognition feature vector 740 corresponds to one or more of the feature vectors 705 of the voice profiles. Each feature vector 705 may be the same size as the user recognition feature vector 740.

To perform user recognition, the user recognition component 195 may determine the user device 110 from which the audio data 211 originated. For example, the audio data 211 may be associated with metadata including a device identifier representing the user device 110. Either the user device 110 or the system component(s) 120 may generate the metadata. The system 100 may determine a group profile identifier associated with the device identifier, may determine user identifiers associated with the group profile identifier, and may include the group profile identifier and/or the user identifiers in the metadata. The system 100 may associate the metadata with the user recognition feature vector 740 produced from the audio data 211. The user recognition component 195 may send a signal to voice profile storage 785, with the signal requesting only audio data and/or feature vectors 705 (depending on whether audio data and/or corresponding feature vectors are stored) associated with the device identifier, the group profile identifier, and/or the user identifiers represented in the metadata. This limits the universe of possible feature vectors 705 the user recognition component 195 considers at runtime and thus decreases the amount of time to perform user recognition processing by decreasing the amount of feature vectors 705 needed to be processed. Alternatively, the user recognition component 195 may access all (or some other subset of) the audio data and/or feature vectors 705 available to the user recognition component 195. However, accessing all audio data and/or feature vectors 705 will likely increase the amount of time needed to perform user recognition processing based on the magnitude of audio data and/or feature vectors 705 to be processed.

If the user recognition component 195 receives audio data from the voice profile storage 785, the user recognition component 195 may generate one or more feature vectors 705 corresponding to the received audio data.

The user recognition component 195 may attempt to identify the user that spoke the speech represented in the audio data 211 by comparing the user recognition feature vector 740 to the feature vector(s) 705. The user recognition component 195 may include a scoring component 722 that determines respective scores indicating whether the user input (represented by the user recognition feature vector 740) was spoken by one or more particular users (represented by the feature vector(s) 705). The user recognition component 195 may also include a confidence component 724 that determines an overall accuracy of user recognition processing (such as those of the scoring component 722) and/or an individual confidence value with respect to each user potentially identified by the scoring component 722. The output from the scoring component 722 may include a different confidence value for each received feature vector 705. For example, the output may include a first confidence value for a first feature vector 705*a* (representing a first voice profile), a second confidence value for a second feature vector 705*b* (representing a second voice profile), etc. Although illustrated as two separate components, the scoring component 722 and the confidence component 724 may be combined into a single component or may be separated into more than two components.

The scoring component 722 and the confidence component 724 may implement one or more trained machine learning models (such as neural networks, classifiers, etc.) as known in the art. For example, the scoring component 722 may use probabilistic linear discriminant analysis (PLDA) techniques. PLDA scoring determines how likely it is that the user recognition feature vector 740 corresponds to a particular feature vector 705. The PLDA scoring may generate a confidence value for each feature vector 705 considered and may output a list of confidence values associated with respective user identifiers. The scoring component 722 may also use other techniques, such as GMMs, generative Bayesian models, or the like, to determine confidence values.

The confidence component 724 may input various data including information about the ASR confidence data 707, speech length (e.g., number of frames or other measured length of the user input), audio condition/quality data (such as signal-to-interference data or other metric data), fingerprint data, image data, or other factors to consider how confident the user recognition component 195 is with regard to the confidence values linking users to the user input. The confidence component 724 may also consider the confidence values and associated identifiers output by the scoring component 722. For example, the confidence component 724 may determine that a lower ASR confidence data 707, or poor audio quality, or other factors, may result in a lower confidence of the user recognition component 195. Whereas a higher ASR confidence data 707, or better audio quality, or other factors, may result in a higher confidence of the user recognition component 195. Precise determination of the confidence may depend on configuration and training of the confidence component 724 and the model(s) implemented thereby. The confidence component 724 may operate using a number of different machine learning models/techniques such as GMM, neural networks, etc. For example, the confidence component 724 may be a classifier configured to map a score output by the scoring component 722 to a confidence value.

The user recognition component 195 may output user recognition data 197 specific to a one or more user identifiers. For example, the user recognition component 195 may output user recognition data 197 with respect to each received feature vector 705. The user recognition data 197 may include numeric confidence values (e.g., 0.0-1.0, 0-1000, or whatever scale the system is configured to operate). Thus, the user recognition data 197 may output an n-best list of potential users with numeric confidence values (e.g., user identifier 123-0.2, user identifier 234-0.8). Alternatively or in addition, the user recognition data 197 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." The user recognition component 195 may output an n-best list of user identifiers with binned confidence values (e.g., user identifier 123—low, user identifier 234-high). Combined binned and numeric confidence value outputs are also possible. Rather than a list of identifiers and their respective confidence values, the user recognition data 197 may only include information related to the top scoring identifier as determined by the user recognition component 195. The user recognition component 195 may also output an overall confidence value that the individual confidence values are correct, where the overall confidence value indicates how confident the user recognition component 195 is in the output results. The confidence component 724 may determine the overall confidence value.

The confidence component 724 may determine differences between individual confidence values when determining the user recognition data 197. For example, if a difference between a first confidence value and a second confidence value is large, and the first confidence value is above a threshold confidence value, then the user recognition component 195 is able to recognize a first user (associated with the feature vector 705 associated with the first confidence value) as the user that spoke the user input with a higher confidence than if the difference between the confidence values were smaller.

The user recognition component 195 may perform thresholding to avoid incorrect user recognition data 197 being output. For example, the user recognition component 195 may compare a confidence value output by the confidence component 724 to a threshold confidence value. If the confidence value does not satisfy (e.g., does not meet or exceed) the threshold confidence value, the user recognition component 195 may not output user recognition data 197, or may only include in that data 197 an indicator that a user that spoke the user input could not be recognized. Further, the user recognition component 195 may not output user recognition data 197 until enough user recognition feature vector data 740 is accumulated and processed to verify a user above a threshold confidence value. Thus, the user recognition component 195 may wait until a sufficient threshold quantity of audio data of the user input has been processed before outputting user recognition data 197. The quantity of received audio data may also be considered by the confidence component 724.

The user recognition component 195 may be defaulted to output binned (e.g., low, medium, high) user recognition confidence values. However, such may be problematic in certain situations. For example, if the user recognition component 195 computes a single binned confidence value for multiple feature vectors 705, the system may not be able to determine which particular user originated the user input. In this situation, the user recognition component 195 may override its default setting and output numeric confidence values. This enables the system to determine a user, associated with the highest numeric confidence value, originated the user input.

The user recognition component 195 may use other data 709 to inform user recognition processing. A trained model(s) or other component of the user recognition component 195 may be trained to take other data 709 as an input feature when performing user recognition processing. Other data 709 may include a variety of data types depending on system configuration and may be made available from other sensors, devices, or storage. The other data 709 may include a time of day at which the audio data 211 was generated by the user device 110 or received from the user device 110, a day of a week in which the audio data 211 was generated by the user device 110 or received from the user device 110, etc.

The other data 709 may include image data or video data. For example, facial recognition may be performed on image data or video data received from the user device 110 from which the audio data 211 was received (or another device). Facial recognition may be performed by the user recognition component 195. The output of facial recognition processing may be used by the user recognition component 195. That is, facial recognition output data may be used in conjunction with the comparison of the user recognition feature vector 740 and one or more feature vectors 705 to perform more accurate user recognition processing.

The other data 709 may include location data of the user device 110. The location data may be specific to a building within which the user device 110 is located. For example, if the user device 110 is located in user A's bedroom, such location may increase a user recognition confidence value associated with user A and/or decrease a user recognition confidence value associated with user B.

The other data 709 may include data indicating a type of the user device 110. Different types of devices may include, for example, a smart watch, a smart phone, a tablet, and a vehicle. The type of the user device 110 may be indicated in a profile associated with the user device 110. For example, if the user device 110 from which the audio data 211 was received is a smart watch or vehicle belonging to a user A, the fact that the user device 110 belongs to user A may increase a user recognition confidence value associated with user A and/or decrease a user recognition confidence value associated with user B.

The other data 709 may include geographic coordinate data associated with the user device 110. For example, a group profile associated with a vehicle may indicate multiple users (e.g., user A and user B). The vehicle may include a global positioning system (GPS) indicating latitude and longitude coordinates of the vehicle when the vehicle generated the audio data 211. As such, if the vehicle is located at a coordinate corresponding to a work location/building of user A, such may increase a user recognition confidence value associated with user A and/or decrease user recognition confidence values of all other users indicated in a group profile associated with the vehicle. A profile associated with the user device 110 may indicate global coordinates and associated locations (e.g., work, home, etc.). One or more user profiles may also or alternatively indicate the global coordinates.

The other data 709 may include data representing activity of a particular user that may be useful in performing user recognition processing. For example, a user may have recently entered a code to disable a home security alarm. A user device 110, represented in a group profile associated with the home, may have generated the audio data 211. The other data 709 may reflect signals from the home security alarm about the disabling user, time of disabling, etc. If a mobile device (such as a smart phone, Tile, dongle, or other device) known to be associated with a particular user is detected proximate to (for example physically close to, connected to the same Wi-Fi network as, or otherwise nearby) the user device 110, this may be reflected in the other data 709 and considered by the user recognition component 195.

Depending on system configuration, the other data 709 may be configured to be included in the user recognition feature vector data 740 so that all the data relating to the user input to be processed by the scoring component 722 may be included in a single feature vector. Alternatively, the other data 709 may be reflected in one or more different data structures to be processed by the scoring component 722.

FIG. 8 is a conceptual diagram of an ASR component 250, according to embodiments of the present disclosure. The ASR component 250 may interpret a spoken natural language input based on the similarity between the spoken natural language input and pre-established language models 854 stored in an ASR model storage 852. For example, the ASR component 250 may compare the audio data with models for sounds (e.g., subword units or phonemes) and sequences of sounds to identify words that match the sequence of sounds spoken in the natural language input. Alternatively, the ASR component 250 may use a finite state transducer (FST) 855 to implement the language model functions.

When the ASR component 250 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 853 stored in the ASR model storage 852), and the likelihood that a particular word, which matches the sounds, would be included in the sentence at the specific location (e.g., using a language or grammar model 854). Based on the considered factors and the assigned confidence score, the ASR component 250 may output an ASR hypothesis that most likely matches the spoken natural language input, or may output multiple ASR hypotheses in the form of a lattice or an N-best list, with each ASR hypothesis corresponding to a respective score.

The ASR component 250 may include a speech recognition engine 858. The ASR component 250 receives audio data 211 (for example, received from a local user device 110 having processed audio detected by a microphone by an acoustic front end (AFE) or other component). The speech recognition engine 858 compares the audio data 211 with acoustic models 853, language models 854, FST(s) 855, and/or other data models and information for recognizing the speech conveyed in the audio data. The audio data 211 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some cases, feature vectors of the audio data may arrive at the supporting device(s) 120 encoded, in which case they may be decoded by the speech recognition engine 858 and/or prior to processing by the speech recognition engine 858.

In some implementations, the ASR component 250 may process the audio data 211 using the ASR model 850. The ASR model 850 may be, for example, a recurrent neural network such as an RNN-T. An example RNN-T architecture is illustrated in FIG. 8. The ASR model 850 may predict a probability (y|x) of labels y=(y₁, . . . yᵤ) given acoustic features x=(x₁, . . . , xₜ). During inference, the ASR model 850 can generate an N-best list using, for example, a beam search decoding algorithm. The ASR model 850 may include an encoder 812, a prediction network 820, a joint network 830, and a softmax 840. The encoder 812 may be similar or analogous to an acoustic model (e.g., similar to the acoustic model 853 described below), and may process a sequence of acoustic input features to generate encoded hidden representations. The prediction network 820 may be similar or analogous to a language model (e.g., similar to the language model 854 described below), and may process the previous output label predictions, and map them to corresponding hidden representations. The joint network 830 may be, for example, a feed forward neural network (NN) that may process hidden representations from both the encoder 812 and prediction network 820, and predict output label probabilities. The softmax 840 may be a function implemented (e.g., as a layer of the joint network 830) to normalize the predicted output probabilities.

The speech recognition engine 858 may process the audio data 211 with reference to information stored in the ASR model storage 852. Feature vectors of the audio data 211 may arrive at the system component 120 encoded, in which case they may be decoded prior to processing by the speech recognition engine 858.

The speech recognition engine 858 attempts to match received feature vectors to language acoustic units (e.g., phonemes) and words as known in the stored acoustic models 853, language models 854, and FST(s) 855. For example, audio data 211 may be processed by one or more acoustic model(s) 853 to determine acoustic unit data. The acoustic unit data may include indicators of acoustic units detected in the audio data 211 by the ASR component 250. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 854 (and/or using FST 855) to determine ASR data 810. The ASR data 810 can include one or more hypotheses. One or more of the hypotheses represented in the ASR data 810 may then be sent to further components (such as the NLU component 260) for further processing as discussed herein. The ASR data 810 may include representations of text of an utterance, such as words, subword units, or the like.

The speech recognition engine 858 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 250 will output ASR hypotheses that make sense grammatically. The specific models used may be general models or may be models corresponding to a particular domain, such as music, banking, etc.

The speech recognition engine 858 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 858 may use the acoustic model(s) 853 to attempt to match received audio feature vectors to words or subword acoustic units. An acoustic unit may be a senone, phoneme, phoneme in context, syllable, part of a syllable, syllable in context, or any other such portion of a word. The speech recognition engine 858 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 250 outputs ASR hypotheses that make sense grammatically.

The speech recognition engine 858 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 858, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 858 may also compute scores of branches of the paths based on language models or grammars. Language modeling involves determining scores for what words are likely to be used together to form coherent words and sentences. Application of a language model may improve the likelihood that the ASR component 250 correctly interprets the speech contained in the audio data. For example, for an input audio sounding like "hello," acoustic model processing that returns the potential phoneme paths of "H E L O", "HALO", and "Y EL O" may be adjusted by a language model to adjust the recognition scores of "H E L O" (interpreted as the word "hello"), "H A L O" (interpreted as the word "halo"), and "Y EL O" (interpreted as the word "yellow") based on the language context of each word within the spoken utterance.

Figure 10:
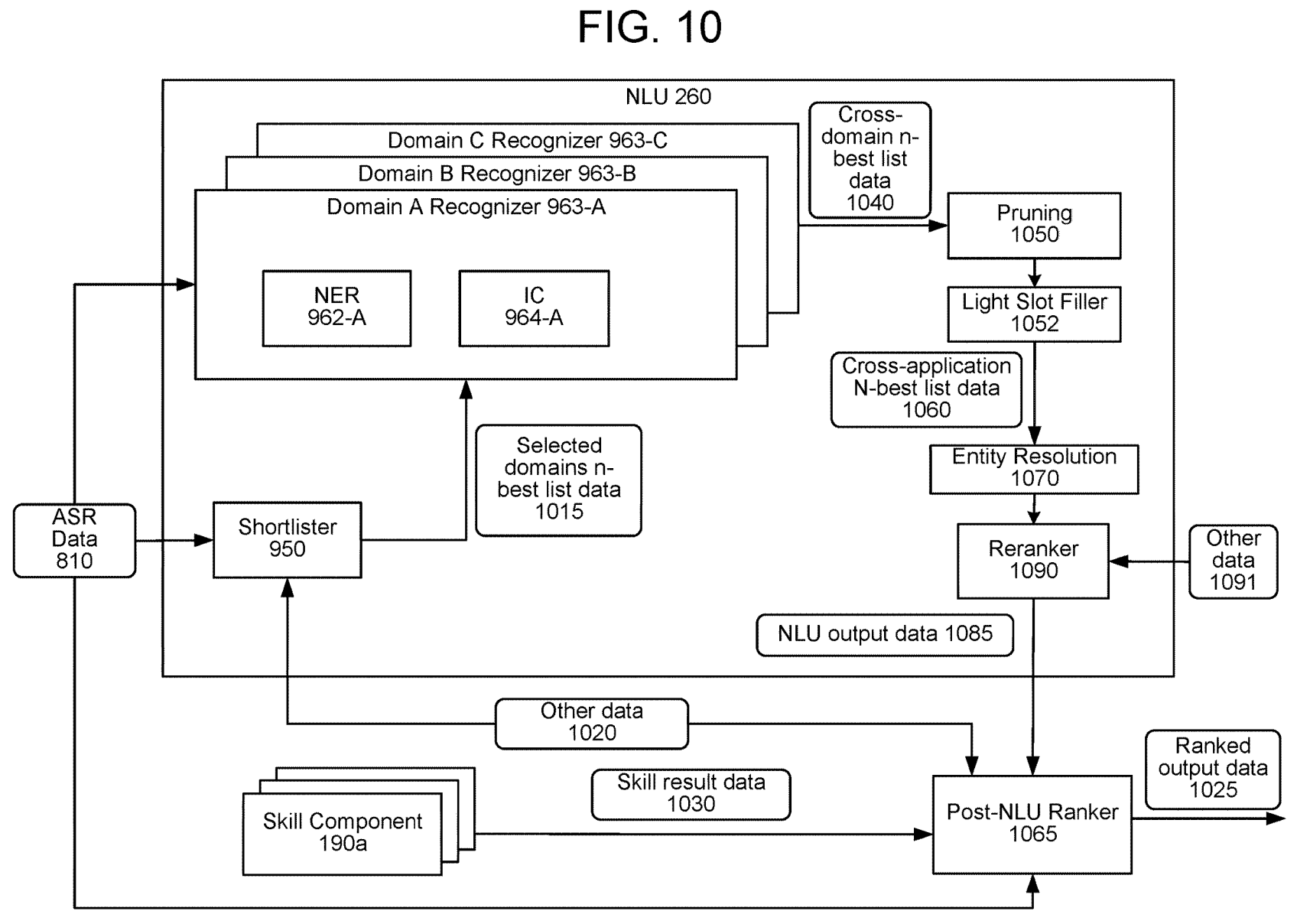

FIGS. 9 and 10 illustrates how the NLU component 260 may perform NLU processing. FIG. 9 is a conceptual diagram of how natural language processing is performed, according to embodiments of the present disclosure. And FIG. 10 is a conceptual diagram of how natural language processing is performed, according to embodiments of the present disclosure.

FIG. 9 illustrates how NLU processing is performed on text data. The NLU component 260 may process text data including several ASR hypotheses of a single user input. For example, if the ASR component 250 outputs text data including an n-best list of ASR hypotheses, the NLU component 260 may process the text data with respect to all (or a portion of) the ASR hypotheses represented therein.

The NLU component 260 may annotate text data by parsing and/or tagging the text data. For example, for the text data "tell me the weather for Seattle," the NLU component 260 may tag "tell me the weather for Seattle" as an<OutputWeather>intent as well as separately tag "Seattle" as a location for the weather information.

The NLU component 260 may include a shortlister component 950. The shortlister component 950 selects skills that may execute with respect to ASR output data 810 input to the NLU component 260 (e.g., applications that may execute with respect to the user input). The ASR output data 810 (which may also be referred to as ASR data 810) may include representations of text of an utterance, such as words, subword units, or the like. The shortlister component 950 thus limits downstream, more resource intensive NLU processes to being performed with respect to skills that may execute with respect to the user input.

Without a shortlister component 950, the NLU component 260 may process ASR output data 810 input thereto with respect to every skill of the system, either in parallel, in series, or using some combination thereof. By implementing a shortlister component 950, the NLU component 260 may process ASR output data 810 with respect to only the skills that may execute with respect to the user input. This reduces total compute power and latency attributed to NLU processing.

The shortlister component 950 may include one or more trained models. The model(s) may be trained to recognize various forms of user inputs that may be received by the system component(s) 120. For example, during a training period skill support system component(s) 225 associated with a skill may provide the system component(s) 120 with training text data representing sample user inputs that may be provided by a user to invoke the skill. For example, for a ride sharing skill, a skill support system component(s) 225 associated with the ride sharing skill may provide the system component(s) 120 with training text data including text corresponding to "get me a cab to [location]," "get me a ride to [location]," "book me a cab to [location]," "book me a ride to [location]," etc. The one or more trained models that will be used by the shortlister component 950 may be trained, using the training text data representing sample user inputs, to determine other potentially related user input structures that users may try to use to invoke the particular skill. During training, the system component(s) 120 may solicit the skill support system component(s) 225 associated with the skill regarding whether the determined other user input structures are permissible, from the perspective of the skill support system component(s) 225, to be used to invoke the skill. The alternate user input structures may be derived by one or more trained models during model training and/or may be based on user input structures provided by different skills. The skill support system component(s) 225 associated with a particular skill may also provide the system component(s) 120 with training text data indicating grammar and annotations. The system component(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 950 may be trained with respect to a different skill. Alternatively, the shortlister component 950 may use one trained model per domain, such as one trained model for skills associated with a weather domain, one trained model for skills associated with a ride sharing domain, etc.

The system component(s) 120 may use the sample user inputs provided by a skill support system component(s) 225, and related sample user inputs potentially determined during training, as binary examples to train a model associated with a skill associated with the skill support system component(s) 225. The model associated with the particular skill may then be operated at runtime by the shortlister component 950. For example, some sample user inputs may be positive examples (e.g., user inputs that may be used to invoke the skill). Other sample user inputs may be negative examples (e.g., user inputs that may not be used to invoke the skill).

As described above, the shortlister component 950 may include a different trained model for each skill of the system, a different trained model for each domain, or some other combination of trained model(s). For example, the shortlister component 950 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 950 to output indications of only a portion of the skills that the ASR output data 810 may relate to. For example, a user input may correspond to "tell me about Tom Collins." If the model is clustered based on domain, the shortlister component 950 may determine the user input corresponds to a recipe skill (e.g., a drink recipe) even though the user input may also correspond to an information skill (e.g., including information about a person named Tom Collins).

The NLU component 260 may include one or more recognizers 963. In at least some embodiments, a recognizer 963 may be associated with a skill support system component(s) 225 (e.g., the recognizer may be configured to interpret text data to correspond to the skill support system component(s) 225). In at least some other examples, a recognizer 963 may be associated with a domain such as smart home, video, music, weather, custom, etc. (e.g., the recognizer may be configured to interpret text data to correspond to the domain).

If the shortlister component 950 determines ASR output data 810 is potentially associated with multiple domains, the recognizers 963 associated with the domains may process the ASR output data 810, while recognizers 963 not indicated in the shortlister component 950's output may not process the ASR output data 810. The "shortlisted" recognizers 963 may process the ASR output data 810 in parallel, in series, partially in parallel, etc. For example, if ASR output data 810 potentially relates to both a communications domain and a music domain, a recognizer associated with the communications domain may process the ASR output data 810 in parallel, or partially in parallel, with a recognizer associated with the music domain processing the ASR output data 810.

Each recognizer 963 may include a named entity recognition (NER) component 962. The NER component 962 attempts to identify grammars and lexical information that may be used to construe meaning with respect to text data input therein. The NER component 962 identifies portions of text data that correspond to a named entity associated with a domain, associated with the recognizer 963 implementing the NER component 962. The NER component 962 (or other component of the NLU component 260) may also determine whether a word refers to an entity whose identity is not explicitly mentioned in the text data, for example "him," "her," "it" or other anaphora, exophora, or the like.

Each recognizer 963, and more specifically each NER component 962, may be associated with a particular grammar database 976, a particular set of intents/actions 974, and a particular personalized lexicon 986. The grammar databases 976, and intents/actions 974 may be stored in an NLU storage 973. Each gazetteer 984 may include domain/skill-indexed lexical information associated with a particular user and/or user device 110. For example, a Gazetteer A (984a) includes skill-indexed lexical information 986aa to 986 an. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 962 applies grammar information 976 and lexical information 986 associated with a domain (associated with the recognizer 963 implementing the NER component 962) to determine a mention of one or more entities in text data. In this manner, the NER component 962 identifies "slots" (each corresponding to one or more particular words in text data) that may be useful for later processing. The NER component 962 may also label each slot with a type (e.g., noun, place, city, artist name, song name, etc.).

Each grammar database 976 includes the names of entities (i.e., nouns) commonly found in speech about the particular domain to which the grammar database 976 relates, whereas the lexical information 986 is personalized to the user and/or the user device 110 from which the user input originated. For example, a grammar database 976 associated with a shopping domain may include a database of words commonly used when people discuss shopping.

A downstream process called entity resolution (discussed in detail elsewhere herein) links a slot of text data to a specific entity known to the system. To perform entity resolution, the NLU component 260 may utilize gazetteer information (984a-984n) stored in an entity library storage 982. The gazetteer information 984 may be used to match text data (representing a portion of the user input) with text data representing known entities, such as song titles, contact names, etc. Gazetteers 984 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 963 may also include an intent classification (IC) component 964. An IC component 964 parses text data to determine an intent(s) (associated with the domain associated with the recognizer 963 implementing the IC component 964) that potentially represents the user input. An intent represents to an action a user desires be performed. An IC component 964 may communicate with a database 974 of words linked to intents. For example, a music intent database may link words and phrases such as "quiet," "volume off," and "mute" to a <Mute>intent. An IC component 964 identifies potential intents by comparing words and phrases in text data (representing at least a portion of the user input) to the words and phrases in an intents database 974 (associated with the domain that is associated with the recognizer 963 implementing the IC component 964).

The intents identifiable by a specific IC component 964 are linked to domain-specific (i.e., the domain associated with the recognizer 963 implementing the IC component 964) grammar frameworks 976 with "slots" to be filled. Each slot of a grammar framework 976 corresponds to a portion of text data that the system believes corresponds to an entity. For example, a grammar framework 976 corresponding to a <PlayMusic>intent may correspond to text data sentence structures such as "Play {Artist Name}," "Play {Album Name}," "Play {Song name}," "Play {Song name} by {Artist Name}," etc. However, to make entity resolution more flexible, grammar frameworks 976 may not be structured as sentences, but rather based on associating slots with grammatical tags.

For example, an NER component 962 may parse text data to identify words as subject, object, verb, preposition, etc. based on grammar rules and/or models prior to recognizing named entities in the text data. An IC component 964 (implemented by the same recognizer 963 as the NER component 962) may use the identified verb to identify an intent. The NER component 962 may then determine a grammar model 976 associated with the identified intent. For example, a grammar model 976 for an intent corresponding to <PlayMusic> may specify a list of slots applicable to play the identified "object" and any object modifier (e.g., a prepositional phrase), such as {Artist Name}, {Album Name}, {Song name}, etc. The NER component 962 may then search corresponding fields in a lexicon 986 (associated with the domain associated with the recognizer 963 implementing the NER component 962), attempting to match words and phrases in text data the NER component 962 previously tagged as a grammatical object or object modifier with those identified in the lexicon 986.

An NER component 962 may perform semantic tagging, which is the labeling of a word or combination of words according to their type/semantic meaning. An NER component 962 may parse text data using heuristic grammar rules, or a model may be constructed using techniques such as Hidden Markov Models, maximum entropy models, log linear models, conditional random fields (CRF), and the like. For example, an NER component 962 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 962 identifies "Play" as a verb based on a word database associated with the music domain, which an IC component 964 (also implemented by the music domain recognizer) may determine corresponds to a<PlayMusic>intent. At this stage, no determination has been made as to the meaning of "mother's little helper" or "the rolling stones," but based on grammar rules and models, the NER component 962 has determined the text of these phrases relates to the grammatical object (i.e., entity) of the user input represented in the text data.

An NER component 962 may tag text data to attribute meaning thereto. For example, an NER component 962 may tag "play mother's little helper by the rolling stones" as: {domain} Music, {intent}<PlayMusic>, {artist name} rolling stones, {media type} SONG, and {song title} mother's little helper. For further example, the NER component 962 may tag "play songs by the rolling stones" as: {domain} Music, {intent}<PlayMusic>, {artist name} rolling stones, and {media type} SONG.

The shortlister component 950 may receive ASR output data 810 output from the ASR component 250 or output from the user device 110b (as illustrated in FIG. 10). The ASR component 250 may embed the ASR output data 810 into a form processable by a trained model(s) using sentence embedding techniques as known in the art. Sentence embedding results in the ASR output data 810 including text in a structure that enables the trained models of the shortlister component 950 to operate on the ASR output data 810. For example, an embedding of the ASR output data 810 may be a vector representation of the ASR output data 810.

The shortlister component 950 may make binary determinations (e.g., yes or no) regarding which domains relate to the ASR output data 810. The shortlister component 950 may make such determinations using the one or more trained models described herein above. If the shortlister component 950 implements a single trained model for each domain, the shortlister component 950 may simply run the models that are associated with enabled domains as indicated in a user profile associated with the user device 110 and/or user that originated the user input.

The shortlister component 950 may generate n-best list data 1015 representing domains that may execute with respect to the user input represented in the ASR output data 810. The size of the n-best list represented in the n-best list data 1015 is configurable. In an example, the n-best list data 1015 may indicate every domain of the system as well as contain an indication, for each domain, regarding whether the domain is likely capable to execute the user input represented in the ASR output data 810. In another example, instead of indicating every domain of the system, the n-best list data 1015 may only indicate the domains that are likely to be able to execute the user input represented in the ASR output data 810. In yet another example, the shortlister component 950 may implement thresholding such that the n-best list data 1015 may indicate no more than a maximum number of domains that may execute the user input represented in the ASR output data 810. In an example, the threshold number of domains that may be represented in the n-best list data 1015 is ten. In another example, the domains included in the n-best list data 1015 may be limited by a threshold a score, where only domains indicating a likelihood to handle the user input is above a certain score (as determined by processing the ASR output data 810 by the shortlister component 950 relative to such domains) are included in the n-best list data 1015.

The ASR output data 810 may correspond to more than one ASR hypothesis. When this occurs, the shortlister component 950 may output a different n-best list (represented in the n-best list data 1015) for each ASR hypothesis. Alternatively, the shortlister component 950 may output a single n-best list representing the domains that are related to the multiple ASR hypotheses represented in the ASR output data 810.

As indicated above, the shortlister component 950 may implement thresholding such that an n-best list output therefrom may include no more than a threshold number of entries. If the ASR output data 810 includes more than one ASR hypothesis, the n-best list output by the shortlister component 950 may include no more than a threshold number of entries irrespective of the number of ASR hypotheses output by the ASR component 250. Alternatively or in addition, the n-best list output by the shortlister component 950 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 810, the shortlister component 950 may generate confidence scores representing likelihoods that domains relate to the ASR output data 810. If the shortlister component 950 implements a different trained model for each domain, the shortlister component 950 may generate a different confidence score for each individual domain trained model that is run. If the shortlister component 950 runs the models of every domain when ASR output data 810 is received, the shortlister component 950 may generate a different confidence score for each domain of the system. If the shortlister component 950 runs the models of only the domains that are associated with skills indicated as enabled in a user profile associated with the user device 110 and/or user that originated the user input, the shortlister component 950 may only generate a different confidence score for each domain associated with at least one enabled skill. If the shortlister component 950 implements a single trained model with domain specifically trained portions, the shortlister component 950 may generate a different confidence score for each domain who's specifically trained portion is run. The shortlister component 950 may perform matrix vector modification to obtain confidence scores for all domains of the system in a single instance of processing of the ASR output data 810.

N-best list data 1015 including confidence scores that may be output by the shortlister component 950 may be represented as, for example:

Search domain, 0.67
Recipe domain, 0.62
Information domain, 0.57
Shopping domain, 0.42 As indicated, the confidence scores output by the shortlister component 950 may be numeric values. The confidence scores output by the shortlister component 950 may alternatively be binned values (e.g., high, medium, low).

The n-best list may only include entries for domains having a confidence score satisfying (e.g., equaling or exceeding) a minimum threshold confidence score. Alternatively, the shortlister component 950 may include entries for all domains associated with user enabled skills, even if one or more of the domains are associated with confidence scores that do not satisfy the minimum threshold confidence score.

The shortlister component 950 may consider other data 1020 when determining which domains may relate to the user input represented in the ASR output data 810 as well as respective confidence scores. The other data 1020 may include usage history data associated with the user device 110 and/or user that originated the user input. For example, a confidence score of a domain may be increased if user inputs originated by the user device 110 and/or user routinely invoke the domain. Conversely, a confidence score of a domain may be decreased if user inputs originated by the user device 110 and/or user rarely invoke the domain. Thus, the other data 1020 may include an indicator of the user associated with the ASR output data 810, for example as determined by the user recognition component 195.

The other data 1020 may be character embedded prior to being input to the shortlister component 950. The other data 1020 may alternatively be embedded using other techniques known in the art prior to being input to the shortlister component 950.

The other data 1020 may also include data indicating the domains associated with skills that are enabled with respect to the user device 110 and/or user that originated the user input. The shortlister component 950 may use such data to determine which domain-specific trained models to run. That is, the shortlister component 950 may determine to only run the trained models associated with domains that are associated with user-enabled skills. The shortlister component 950 may alternatively use such data to alter confidence scores of domains.

As an example, considering two domains, a first domain associated with at least one enabled skill and a second domain not associated with any user-enabled skills of the user that originated the user input, the shortlister component 950 may run a first model specific to the first domain as well as a second model specific to the second domain. Alternatively, the shortlister component 950 may run a model configured to determine a score for each of the first and second domains. The shortlister component 950 may determine a same confidence score for each of the first and second domains in the first instance. The shortlister component 950 may then alter those confidence scores based on which domains is associated with at least one skill enabled by the present user. For example, the shortlister component 950 may increase the confidence score associated with the domain associated with at least one enabled skill while leaving the confidence score associated with the other domain the same. Alternatively, the shortlister component 950 may leave the confidence score associated with the domain associated with at least one enabled skill the same while decreasing the confidence score associated with the other domain. Moreover, the shortlister component 950 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage component 170. When the shortlister component 950 receives the ASR output data 810, the shortlister component 950 may determine whether profile data associated with the user 5 and/or user device 110 that originated the input includes an indication of enabled skills.

The other data 1020 may also include data indicating the type of the user device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 950 may use such data to determine which domain-specific trained models to run. For example, if the user device 110 corresponds to a displayless type device, the shortlister component 950 may determine not to run trained models specific to domains that output video data. The shortlister component 950 may alternatively use such data to alter confidence scores of domains.

As an example, considering two domains, one that outputs audio data and another that outputs video data, the shortlister component 950 may run a first model specific to the domain that generates audio data as well as a second model specific to the domain that generates video data. Alternatively the shortlister component 950 may run a model configured to determine a score for each domain. The shortlister component 950 may determine a same confidence score for each of the domains in the first instance. The shortlister component 950 may then alter the original confidence scores based on the type of the user device 110 that originated the user input corresponding to the ASR output data 810. For example, if the user device 110 is a displayless device, the shortlister component 950 may increase the confidence score associated with the domain that generates audio data while leaving the confidence score associated with the domain that generates video data the same. Alternatively, if the user device 110 is a displayless device, the shortlister component 950 may leave the confidence score associated with the domain that generates audio data the same while decreasing the confidence score associated with the domain that generates video data. Moreover, if the user device 110 is a displayless device, the shortlister component 950 may increase the confidence score associated with the domain that generates audio data as well as decrease the confidence score associated with the domain that generates video data.

The type of device information represented in the other data 1020 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 1020 may represent the smart TV of other display device, and not the displayless device that captured the spoken user input.

The other data 1020 may also include data indicating the user input originating device's speed, location, or other mobility information. For example, the device may correspond to a vehicle including a display. If the vehicle is moving, the shortlister component 950 may decrease the confidence score associated with a domain that generates video data as it may be undesirable to output video content to a user while the user is driving. The device may output data to the system component(s) 120 indicating when the device is moving.

The other data 1020 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 950 may use such data to alter confidence scores of domains. For example, the shortlister component 950 may run a first model specific to a first domain as well as a second model specific to a second domain. Alternatively, the shortlister component 950 may run a model configured to determine a score for each domain. The shortlister component 950 may also determine a same confidence score for each of the domains in the first instance. The shortlister component 950 may then alter the original confidence scores based on the first domain being invoked to cause the system to output content while the current user input was received. Based on the first domain being invoked, the shortlister component 950 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 1015 generated by the shortlister component 950 as well as the different types of other data 1020 considered by the shortlister component 950 are configurable. For example, the shortlister component 950 may update confidence scores as more other data 1020 is considered. For further example, the n-best list data 1015 may exclude relevant domains if thresholding is implemented. Thus, for example, the shortlister component 950 may include an indication of a domain in the n-best list data 1015 unless the shortlister component 950 is one hundred percent confident that the domain may not execute the user input represented in the ASR output data 810 (e.g., the shortlister component 950 determines a confidence score of zero for the domain).

The shortlister component 950 may send the ASR output data 810 to recognizers 963 associated with domains represented in the n-best list data 1015. Alternatively, the shortlister component 950 may send the n-best list data 1015 or some other indicator of the selected subset of domains to another component (such as the orchestrator component 230) which may in turn send the ASR output data 810 to the recognizers 963 corresponding to the domains included in the n-best list data 1015 or otherwise indicated in the indicator. If the shortlister component 950 generates an n-best list representing domains without any associated confidence scores, the shortlister component 950/orchestrator component 230 may send the ASR output data 810 to recognizers 963 associated with domains that the shortlister component 950 determines may execute the user input. If the shortlister component 950 generates an n-best list representing domains with associated confidence scores, the shortlister component 950/orchestrator component 230 may send the ASR output data 810 to recognizers 963 associated with domains associated with confidence scores satisfying (e.g., meeting or exceeding) a threshold minimum confidence score.

A recognizer 963 may output tagged text data generated by an NER component 962 and an IC component 964, as described herein above. The NLU component 260 may compile the output tagged text data of the recognizers 963 into a single cross-domain n-best list data 1040 and may send the cross-domain n-best list data 1040 to a pruning component 1050. Each entry of tagged text (e.g., each NLU hypothesis) represented in the cross-domain n-best list data 1040 may be associated with a respective score indicating a likelihood that the NLU hypothesis corresponds to the domain associated with the recognizer 963 from which the NLU hypothesis was output. For example, the cross-domain n-best list data 1040 may be represented as (with each line corresponding to a different NLU hypothesis):

[0.95] Intent: <PlayMusic>ArtistName: Beethoven Song-Name: Waldstein Sonata

[0.70] Intent: <Play Video>ArtistName: Beethoven VideoName: Waldstein Sonata

[0.01] Intent: <PlayMusic>ArtistName: Beethoven AlbumName: Waldstein Sonata

[0.01] Intent: <PlayMusic>SongName: Waldstein Sonata

The pruning component 1050 may sort the NLU hypotheses represented in the cross-domain n-best list data 1040 according to their respective scores. The pruning component 1050 may perform score thresholding with respect to the cross-domain NLU hypotheses. For example, the pruning component 1050 may select NLU hypotheses associated with scores satisfying (e.g., meeting and/or exceeding) a threshold score. The pruning component 1050 may also or alternatively perform number of NLU hypothesis thresholding. For example, the pruning component 1050 may select the top scoring NLU hypothesis(es). The pruning component 1050 may output a portion of the NLU hypotheses input thereto. The purpose of the pruning component 1050 is to create a reduced list of NLU hypotheses so that downstream, more resource intensive, processes may only operate on the NLU hypotheses that most likely represent the user's intent.

The NLU component 260 may include a light slot filler component 1052. The light slot filler component 1052 can take text from slots represented in the NLU hypotheses output by the pruning component 1050 and alter them to make the text more easily processed by downstream components. The light slot filler component 1052 may perform low latency operations that do not involve heavy operations such as reference to a knowledge base (e.g., 972. The purpose of the light slot filler component 1052 is to replace words with other words or values that may be more easily understood by downstream components. For example, if a NLU hypothesis includes the word "tomorrow," the light slot filler component 1052 may replace the word "tomorrow" with an actual date for purposes of downstream processing. Similarly, the light slot filler component 1052 may replace the word "CD" with "album" or the words "compact disc." The replaced words are then included in the cross-domain n-best list data 1060.

The cross-domain n-best list data 1060 may be input to an entity resolution component 1070. The entity resolution component 1070 can apply rules or other instructions to standardize labels or tokens from previous stages into an intent/slot representation. The precise transformation may depend on the domain. For example, for a travel domain, the entity resolution component 1070 may transform text corresponding to "Boston airport" to the standard BOS three-letter code referring to the airport. The entity resolution component 1070 can refer to a knowledge base (e.g., 972) that is used to specifically identify the precise entity referred to in each slot of each NLU hypothesis represented in the cross-domain n-best list data 1060. Specific intent/slot combinations may also be tied to a particular source, which may then be used to resolve the text. In the example "play songs by the stones," the entity resolution component 1070 may reference a personal music catalog, Amazon Music account, a user profile, or the like. The entity resolution component 1070 may output an altered n-best list that is based on the cross-domain n-best list 1060 but that includes more detailed information (e.g., entity IDs) about the specific entities mentioned in the slots and/or more detailed slot data that can eventually be used by a skill. The NLU component 260 may include multiple entity resolution components 1070 and each entity resolution component 1070 may be specific to one or more domains.

The NLU component 260 may include a reranker 1090. The reranker 1090 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 1070.

The reranker 1090 may apply re-scoring, biasing, or other techniques. The reranker 1090 may consider not only the data output by the entity resolution component 1070, but may also consider other data 1091. The other data 1091 may include a variety of information. For example, the other data 1091 may include skill rating or popularity data. For example, if one skill has a high rating, the reranker 1090 may increase the score of a NLU hypothesis that may be processed by the skill. The other data 1091 may also include information about skills that have been enabled by the user that originated the user input. For example, the reranker 1090 may assign higher scores to NLU hypothesis that may be processed by enabled skills than NLU hypothesis that may be processed by non-enabled skills. The other data 1091 may also include data indicating user usage history, such as if the user that originated the user input regularly uses a particular skill or does so at particular times of day. The other data 1091 may additionally include data indicating date, time, location, weather, type of user device 110, user identifier, context, as well as other information. For example, the reranker 1090 may consider when any particular skill is currently active (e.g., music being played, a game being played, etc.).

As illustrated and described, the entity resolution component 1070 is implemented prior to the reranker 1090. The entity resolution component 1070 may alternatively be implemented after the reranker 1090. Implementing the entity resolution component 1070 after the reranker 1090 limits the NLU hypotheses processed by the entity resolution component 1070 to only those hypotheses that successfully pass through the reranker 1090.

The reranker 1090 may be a global reranker (e.g., one that is not specific to any particular domain). Alternatively, the NLU component 260 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 260 may perform NLU processing described above with respect to domains associated with skills wholly implemented as part of the system component(s) 120 (e.g., designated 190 in FIG. 1). The NLU component 260 may separately perform NLU processing described above with respect to domains associated with skills that are at least partially implemented as part of the skill support system component(s) 225. In an example, the shortlister component 950 may only process with respect to these latter domains. Results of these two NLU processing paths may be merged into NLU output data 1085, which may be sent to a post-NLU ranker 1065, which may be implemented by the system component(s) 120.

The post-NLU ranker 1065 may include a statistical component that produces a ranked list of intent/skill pairs with associated confidence scores. Each confidence score may indicate an adequacy of the skill's execution of the intent with respect to NLU results data associated with the skill. The post-NLU ranker 1065 may operate one or more trained models configured to process the NLU results data 1085, skill result data 1030, and the other data 1020 in order to output ranked output data 1025. The ranked output data 1025 may include an n-best list where the NLU hypotheses in the NLU results data 1085 are reordered such that the n-best list in the ranked output data 1025 represents a prioritized list of skills to respond to a user input as determined by the post-NLU ranker 1065. The ranked output data 1025 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 1065 enables the system to better determine the best skill to execute the user input. For example, first and second NLU hypotheses in the NLU results data 1085 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 1065 (or other scheduling component such as orchestrator component 230) may solicit the first skill and the second skill to provide potential result data 1030 based on the first NLU hypothesis and the second NLU hypothesis, respectively. For example, the post-NLU ranker 1065 may send the first NLU hypothesis to the first skill component 190*a* along with a request for the first skill component 190*a* to at least partially execute with respect to the first NLU hypothesis. The post-NLU ranker 1065 may also send the second NLU hypothesis to the second skill component 190*b* along with a request for the second skill component 190*b* to at least partially execute with respect to the second NLU hypothesis. The post-NLU ranker 1065 receives, from the first skill component 190*a*, first result data 1030*a* generated from the first skill component 190*a*'s execution with respect to the first NLU hypothesis. The post-NLU ranker 1065 also receives, from the second skill component 190*b*, second results data 1030*b* generated from the second skill component 190*b*'s execution with respect to the second NLU hypothesis.

The result data 1030 may include various portions. For example, the result data 1030 may include content (e.g., audio data, text data, and/or video data) to be output to a user. The result data 1030 may also include a unique identifier used by the system component(s) 120 and/or the skill support system component(s) 225 to locate the data to be output to a user. The result data 1030 may also include an instruction. For example, if the user input corresponds to "turn on the light," the result data 1030 may include an instruction causing the system to turn on a light associated with a profile of the device (110*a*/110*b*) and/or user.

The post-NLU ranker 1065 may consider the first result data 1030*a* and the second result data 1030*b* to alter the first confidence score and the second confidence score of the first NLU hypothesis and the second NLU hypothesis, respectively. That is, the post-NLU ranker 1065 may generate a third confidence score based on the first result data 1030*a* and the first confidence score. The third confidence score may correspond to how likely the post-NLU ranker 1065 determines the first skill will correctly respond to the user input. The post-NLU ranker 1065 may also generate a fourth confidence score based on the second result data 1030*b* and the second confidence score. One skilled in the art will appreciate that a first difference between the third confidence score and the fourth confidence score may be greater than a second difference between the first confidence score and the second confidence score. The post-NLU ranker 1065 may also consider the other data 1020 to generate the third confidence score and the fourth confidence score. While it has been described that the post-NLU ranker 1065 may alter the confidence scores associated with first and second NLU hypotheses, one skilled in the art will appreciate that the post-NLU ranker 1065 may alter the confidence scores of more than two NLU hypotheses. The post-NLU ranker 1065 may select the result data 1030 associated with the skill component 190 with the highest altered confidence score to be the data output in response to the current user input. The post-NLU ranker 1065 may also consider the ASR output data 810 to alter the NLU hypotheses confidence scores.

The orchestrator component 230 may, prior to sending the NLU results data 1085 to the post-NLU ranker 1065, associate intents in the NLU hypotheses with skill components 190. For example, if a NLU hypothesis includes a<PlayMusic>intent, the orchestrator component 230 may associate the NLU hypothesis with one or more skill components 190 that can execute the <PlayMusic>intent. Thus, the orchestrator component 230 may send the NLU results data 1085, including NLU hypotheses paired with skill components 190, to the post-NLU ranker 1065. In response to ASR output data 810 corresponding to "what should I do for dinner today," the orchestrator component 230 may generates pairs of skill components 190 with associated NLU hypotheses corresponding to:

Skill 1/NLU hypothesis including <Help>intent
   Skill 2/NLU hypothesis including <Order>intent
   Skill 3/NLU hypothesis including <DishType>intent The post-NLU ranker 1065 queries each skill component 190, paired with a NLU hypothesis in the NLU output data 1085, to provide result data 1030 based on the NLU hypothesis with which it is associated. That is, with respect to each skill, the post-NLU ranker 1065 colloquially asks the each skill "if given this NLU hypothesis, what would you do with it." According to the above example, the post-NLU ranker 1065 may send skill components 190 the following data:

Skill 1: First NLU hypothesis including <Help>intent indicator
   Skill 2: Second NLU hypothesis including <Order>intent indicator
   Skill 3: Third NLU hypothesis including <DishType>intent indicator The post-NLU ranker 1065 may query each of the skill components 190 in parallel or substantially in parallel.

A skill component 190 may provide the post-NLU ranker 1065 with various data and indications in response to the post-NLU ranker 1065 soliciting the skill component 190 for result data 1030. A skill component 190 may simply provide the post-NLU ranker 1065 with an indication of whether or not the skill can execute with respect to the NLU hypothesis it received. A skill component 190 may also or alternatively provide the post-NLU ranker 1065 with output data generated based on the NLU hypothesis it received. In some situations, a skill component 190 may need further information in addition to what is represented in the received NLU hypothesis to provide output data responsive to the user input. In these situations, the skill component 190 may provide the post-NLU ranker 1065 with result data 1030 indicating slots of a framework that the skill component 190 further needs filled or entities that the skill component 190 further needs resolved prior to the skill component 190 being able to provided result data 1030 responsive to the user input. The skill component 190 may also provide the post-NLU ranker 1065 with an instruction and/or computer-generated speech indicating how the skill component 190 recommends the system solicit further information needed by the skill component 190. The skill component 190 may further provide the post-NLU ranker 1065 with an indication of whether the skill component 190 will have all needed information after the user provides additional information a single time, or whether the skill component 190 will need the user to provide various kinds of additional information prior to the skill component 190 having all needed information. According to the above example, skill components 190 may provide the post-NLU ranker 1065 with the following:

Skill 1: indication representing the skill can execute with respect to a NLU hypothesis including the <Help>intent indicator
   Skill 2: indication representing the skill needs to the system to obtain further information Skill 3: indication representing the skill can provide numerous results in response to the third NLU hypothesis including the <DishType>intent indicator Result data 1030 includes an indication provided by a skill component 190 indicating whether or not the skill component 190 can execute with respect to a NLU hypothesis; data generated by a skill component 190 based on a NLU hypothesis; as well as an indication provided by a skill component 190 indicating the skill component 190 needs further information in addition to what is represented in the received NLU hypothesis.

The post-NLU ranker 1065 uses the result data 1030 provided by the skill components 190 to alter the NLU processing confidence scores generated by the reranker 1090. That is, the post-NLU ranker 1065 uses the result data 1030 provided by the queried skill components 190 to create larger differences between the NLU processing confidence scores generated by the reranker 1090. Without the post-NLU ranker 1065, the system may not be confident enough to determine an output in response to a user input, for example when the NLU hypotheses associated with multiple skills are too close for the system to confidently determine a single skill component 190 to invoke to respond to the user input. For example, if the system does not implement the post-NLU ranker 1065, the system may not be able to determine whether to obtain output data from a general reference information skill or a medical information skill in response to a user input corresponding to "what is acne."

The post-NLU ranker 1065 may prefer skill components 190 that provide result data 1030 responsive to NLU hypotheses over skill components 190 that provide result data 1030 corresponding to an indication that further information is needed, as well as skill components 190 that provide result data 1030 indicating they can provide multiple responses to received NLU hypotheses. For example, the post-NLU ranker 1065 may generate a first score for a first skill component 190a that is greater than the first skill's NLU confidence score based on the first skill component 190a providing result data 1030a including a response to a NLU hypothesis. For further example, the post-NLU ranker 1065 may generate a second score for a second skill component 190b that is less than the second skill's NLU confidence score based on the second skill component 190b providing result data 1030b indicating further information is needed for the second skill component 190b to provide a response to a NLU hypothesis. Yet further, for example, the post-NLU ranker 1065 may generate a third score for a third skill component 190c that is less than the third skill's NLU confidence score based on the third skill component 190c providing result data 1030c indicating the third skill component 190c can provide multiple responses to a NLU hypothesis.

The post-NLU ranker 1065 may consider other data 1020 in determining scores. The other data 1020 may include rankings associated with the queried skill components 190. A ranking may be a system ranking or a user-specific ranking. A ranking may indicate a veracity of a skill from the perspective of one or more users of the system. For example, the post-NLU ranker 1065 may generate a first score for a first skill component 190a that is greater than the first skill's NLU processing confidence score based on the first skill component 190a being associated with a high ranking. For further example, the post-NLU ranker 1065 may generate a second score for a second skill component 190b that is less than the second skill's NLU processing confidence score based on the second skill component 190b being associated with a low ranking.

The other data 1020 may include information indicating whether or not the user that originated the user input has enabled one or more of the queried skill components 190. For example, the post-NLU ranker 1065 may generate a first score for a first skill component 190*a* that is greater than the first skill's NLU processing confidence score based on the first skill component 190*a* being enabled by the user that originated the user input. For further example, the post-NLU ranker 1065 may generate a second score for a second skill component 190*b* that is less than the second skill's NLU processing confidence score based on the second skill component 190*b* not being enabled by the user that originated the user input. When the post-NLU ranker 1065 receives the NLU results data 1085, the post-NLU ranker 1065 may determine whether profile data, associated with the user and/or device that originated the user input, includes indications of enabled skills.

The other data 1020 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 1065 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 1065 may increase the NLU processing confidence score associated with a first skill configured to output visual data and/or decrease the NLU processing confidence score associated with a second skill configured to output audio data.

The other data 1020 may include information indicating the veracity of the result data 1030 provided by a skill component 190. For example, if a user says "tell me a recipe for pasta sauce," a first skill component 190*a* may provide the post-NLU ranker 1065 with first result data 1030*a* corresponding to a first recipe associated with a five star rating and a second skill component 190*b* may provide the post-NLU ranker 1065 with second result data 1030*b* corresponding to a second recipe associated with a one star rating. In this situation, the post-NLU ranker 1065 may increase the NLU processing confidence score associated with the first skill component 190*a* based on the first skill component 190*a* providing the first result data 1030*a* associated with the five star rating and/or decrease the NLU processing confidence score associated with the second skill component 190*b* based on the second skill component 190*b* providing the second result data 1030*b* associated with the one star rating.

The other data 1020 may include information indicating the type of device that originated the user input. For example, the device may correspond to a "hotel room" type if the device is located in a hotel room. If a user inputs a command corresponding to "order me food" to the device located in the hotel room, the post-NLU ranker 1065 may increase the NLU processing confidence score associated with a first skill component 190*a* corresponding to a room service skill associated with the hotel and/or decrease the NLU processing confidence score associated with a second skill component 190*b* corresponding to a food skill not associated with the hotel.

The other data 1020 may include information indicating a location of the device and/or user that originated the user input. The system may be configured with skill components 190 that may only operate with respect to certain geographic locations. For example, a user may provide a user input corresponding to "when is the next train to Portland." A first skill component 190*a* may operate with respect to trains that arrive at, depart from, and pass through Portland, Oregon. A second skill component 190*b* may operate with respect to trains that arrive at, depart from, and pass through Portland, Maine. If the device and/or user that originated the user input is located in Seattle, Washington, the post-NLU ranker 1065 may increase the NLU processing confidence score associated with the first skill component 190*a* and/or decrease the NLU processing confidence score associated with the second skill component 190*b*. Likewise, if the device and/or user that originated the user input is located in Boston, Massachusetts, the post-NLU ranker 1065 may increase the NLU processing confidence score associated with the second skill component 190*b* and/or decrease the NLU processing confidence score associated with the first skill component 190*a*.

The other data 1020 may include information indicating a time of day. The system may be configured with skill components 190 that operate with respect to certain times of day. For example, a user may provide a user input corresponding to "order me food." A first skill component 190*a* may generate first result data 1030*a* corresponding to breakfast. A second skill component 190*b* may generate second result data 1030*b* corresponding to dinner. If the system component(s) 120 receives the user input in the morning, the post-NLU ranker 1065 may increase the NLU processing confidence score associated with the first skill component 190*a* and/or decrease the NLU processing score associated with the second skill component 190*b*. If the system component(s) 120 receives the user input in the afternoon or evening, the post-NLU ranker 1065 may increase the NLU processing confidence score associated with the second skill component 190*b* and/or decrease the NLU processing confidence score associated with the first skill component 190*a*.

The other data 1020 may include information indicating user preferences. The system may include multiple skill components 190 configured to execute in substantially the same manner. For example, a first skill component 190*a* and a second skill component 190*b* may both be configured to order food from respective restaurants. The system may store a user preference (e.g., in the profile storage component 170) that is associated with the user that provided the user input to the system component(s) 120 as well as indicates the user prefers the first skill component 190*a* over the second skill component 190*b*. Thus, when the user provides a user input that may be executed by both the first skill component 190*a* and the second skill component 190*b*, the post-NLU ranker 1065 may increase the NLU processing confidence score associated with the first skill component 190*a* and/or decrease the NLU processing confidence score associated with the second skill component 190*b*.

The other data 1020 may include information indicating system usage history associated with the user that originated the user input. For example, the system usage history may indicate the user originates user inputs that invoke a first skill component 190*a* more often than the user originates user inputs that invoke a second skill component 190*b*. Based on this, if the present user input may be executed by both the first skill component 190*a* and the second skill component 190*b*, the post-NLU ranker 1065 may increase the NLU processing confidence score associated with the first skill component 190*a* and/or decrease the NLU processing confidence score associated with the second skill component 190*b*.

The other data 1020 may include information indicating a speed at which the user device 110 that originated the user input is traveling. For example, the user device 110 may be located in a moving vehicle, or may be a moving vehicle. When a user device 110 is in motion, the system may prefer audio outputs rather than visual outputs to decrease the likelihood of distracting the user (e.g., a driver of a vehicle). Thus, for example, if the user device 110 that originated the user input is moving at or above a threshold speed (e.g., a speed above an average user's walking speed), the post-NLU ranker 1065 may increase the NLU processing confidence score associated with a first skill component 190*a* that generates audio data. The post-NLU ranker 1065 may also or alternatively decrease the NLU processing confidence score associated with a second skill component 190*b* that generates image data or video data.

The other data 1020 may include information indicating how long it took a skill component 190 to provide result data 1030 to the post-NLU ranker 1065. When the post-NLU ranker 1065 multiple skill components 190 for result data 1030, the skill components 190 may respond to the queries at different speeds. The post-NLU ranker 1065 may implement a latency budget. For example, if the post-NLU ranker 1065 determines a skill component 190 responds to the post-NLU ranker 1065 within a threshold amount of time from receiving a query from the post-NLU ranker 1065, the post-NLU ranker 1065 may increase the NLU processing confidence score associated with the skill component 190. Conversely, if the post-NLU ranker 1065 determines a skill component 190 does not respond to the post-NLU ranker 1065 within a threshold amount of time from receiving a query from the post-NLU ranker 1065, the post-NLU ranker 1065 may decrease the NLU processing confidence score associated with the skill component 190.

It has been described that the post-NLU ranker 1065 uses the other data 1020 to increase and decrease NLU processing confidence scores associated with various skill components 190 that the post-NLU ranker 1065 has already requested result data from. Alternatively, the post-NLU ranker 1065 may use the other data 1020 to determine which skill components 190 to request result data from. For example, the post-NLU ranker 1065 may use the other data 1020 to increase and/or decrease NLU processing confidence scores associated with skill components 190 associated with the NLU results data 1085 output by the NLU component 260. The post-NLU ranker 1065 may select n-number of top scoring altered NLU processing confidence scores. The post-NLU ranker 1065 may then request result data 1030 from only the skill components 190 associated with the selected n-number of NLU processing confidence scores.

As described, the post-NLU ranker 1065 may request result data 1030 from all skill components 190 associated with the NLU results data 1085 output by the NLU component 260. Alternatively, the system component(s) 120 may prefer result data 1030 from skills implemented entirely by the system component(s) 120 rather than skills at least partially implemented by the skill support system component(s) 225. Therefore, in the first instance, the post-NLU ranker 1065 may request result data 1030 from only skills associated with the NLU results data 1085 and entirely implemented by the system component(s) 120. The post-NLU ranker 1065 may only request result data 1030 from skills associated with the NLU results data 1085, and at least partially implemented by the skill support system component(s) 225, if none of the skills, wholly implemented by the system component(s) 120, provide the post-NLU ranker 1065 with result data 1030 indicating either data response to the NLU results data 1085, an indication that the skill can execute the user input, or an indication that further information is needed.

As indicated above, the post-NLU ranker 1065 may request result data 1030 from multiple skill components 190. If one of the skill components 190 provides result data 1030 indicating a response to a NLU hypothesis and the other skills provide result data 1030 indicating either they cannot execute or they need further information, the post-NLU ranker 1065 may select the result data 1030 including the response to the NLU hypothesis as the data to be output to the user. If more than one of the skill components 190 provides result data 1030 indicating responses to NLU hypotheses, the post-NLU ranker 1065 may consider the other data 1020 to generate altered NLU processing confidence scores, and select the result data 1030 of the skill associated with the greatest score as the data to be output to the user.

A system that does not implement the post-NLU ranker 1065 may select the highest scored NLU hypothesis in the NLU results data 1085. The system may send the NLU hypothesis to a skill component 190 associated therewith along with a request for output data. In some situations, the skill component 190 may not be able to provide the system with output data. This results in the system indicating to the user that the user input could not be processed even though another skill associated with lower ranked NLU hypothesis could have provided output data responsive to the user input.

The post-NLU ranker 1065 reduces instances of the aforementioned situation. As described, the post-NLU ranker 1065 queries multiple skills associated with the NLU results data 1085 to provide result data 1030 to the post-NLU ranker 1065 prior to the post-NLU ranker 1065 ultimately determining the skill component 190 to be invoked to respond to the user input. Some of the skill components 190 may provide result data 1030 indicating responses to NLU hypotheses while other skill components 190 may providing result data 1030 indicating the skills cannot provide responsive data. Whereas a system not implementing the post-NLU ranker 1065 may select one of the skill components 190 that could not provide a response, the post-NLU ranker 1065 only selects a skill component 190 that provides the post-NLU ranker 1065 with result data corresponding to a response, indicating further information is needed, or indicating multiple responses can be generated.

The post-NLU ranker 1065 may select result data 1030, associated with the skill component 190 associated with the highest score, for output to the user. Alternatively, the post-NLU ranker 1065 may output ranked output data 1025 indicating skill components 190 and their respective post-NLU ranker rankings. Since the post-NLU ranker 1065 receives result data 1030, potentially corresponding to a response to the user input, from the skill components 190 prior to post-NLU ranker 1065 selecting one of the skills or outputting the ranked output data 1025, little to no latency occurs from the time skills provide result data 1030 and the time the system outputs responds to the user.

If the post-NLU ranker 1065 selects result audio data to be output to a user and the system determines content should be output audibly, the post-NLU ranker 1065 (or another component of the system component(s) 120) may cause the user device 110*a* and/or the user device 110*b* to output audio corresponding to the result audio data. If the post-NLU ranker 1065 selects result text data to output to a user and the system determines content should be output visually, the post-NLU ranker 1065 (or another component of the system component(s) 120) may cause the user device 110*b* to display text corresponding to the result text data. If the post-NLU ranker 1065 selects result audio data to output to a user and the system determines content should be output visually, the post-NLU ranker 1065 (or another component of the system component(s) 120) may send the result audio data to the ASR component 250. The ASR component 250 may generate output text data corresponding to the result audio data. The system component(s) 120 may then cause the user device 110*b* to display text corresponding to the output text data. If the post-NLU ranker 1065 selects result text data to output to a user and the system determines content should be output audibly, the post-NLU ranker 1065 (or another component of the system component(s) 120) may send the result text data to the TTS component 280. The TTS component 280 may generate output audio data (corresponding to computer-generated speech) based on the result text data. The system component(s) 120 may then cause the user device 110*a* and/or the user device 110*b* to output audio corresponding to the output audio data.

As described, a skill component 190 may provide result data 1030 either indicating a response to the user input, indicating more information is needed for the skill component 190 to provide a response to the user input, or indicating the skill component 190 cannot provide a response to the user input. If the skill component 190 associated with the highest post-NLU ranker score provides the post-NLU ranker 1065 with result data 1030 indicating a response to the user input, the post-NLU ranker 1065 (or another component of the system component(s) 120, such as the orchestrator component 230) may simply cause content corresponding to the result data 1030 to be output to the user. For example, the post-NLU ranker 1065 may send the result data 1030 to the orchestrator component 230. The orchestrator component 230 may cause the result data 1030 to be sent to the device (110*a*/110*b*), which may output audio and/or display text corresponding to the result data 1030. The orchestrator component 230 may send the result data 1030 to the ASR component 250 to generate output text data and/or may send the result data 1030 to the TTS component 280 to generate output audio data, depending on the situation.

The skill component 190 associated with the highest post-NLU ranker score may provide the post-NLU ranker 1065 with result data 1030 indicating more information is needed as well as instruction data. The instruction data may indicate how the skill component 190 recommends the system obtain the needed information. For example, the instruction data may correspond to text data or audio data (i.e., computer-generated speech) corresponding to "please indicate" The instruction data may be in a format (e.g., text data or audio data) capable of being output by the device (110*a*/110*b*). When this occurs, the post-NLU ranker 1065 may simply cause the received instruction data be output by the device (110*a*/110*b*). Alternatively, the instruction data may be in a format that is not capable of being output by the device (110*a*/110*b*). When this occurs, the post-NLU ranker 1065 may cause the ASR component 250 or the TTS component 280 to process the instruction data, depending on the situation, to generate instruction data that may be output by the device (110*a*/110*b*). Once the user provides the system with all further information needed by the skill component 190, the skill component 190 may provide the system with result data 1030 indicating a response to the user input, which may be output by the system as detailed above.

The system may include "informational" skill components 190 that simply provide the system with information, which the system outputs to the user. The system may also include "transactional" skill components 190 that require a system instruction to execute the user input. Transactional skill components 190 include ride sharing skills, flight booking skills, etc. A transactional skill component 190 may simply provide the post-NLU ranker 1065 with result data 1030 indicating the transactional skill component 190 can execute the user input. The post-NLU ranker 1065 may then cause the system to solicit the user for an indication that the system is permitted to cause the transactional skill component 190 to execute the user input. The user-provided indication may be an audible indication or a tactile indication (e.g., activation of a virtual button or input of text via a virtual keyboard). In response to receiving the user-provided indication, the system may provide the transactional skill component 190 with data corresponding to the indication. In response, the transactional skill component 190 may execute the command (e.g., book a flight, book a train ticket, etc.). Thus, while the system may not further engage an informational skill component 190 after the informational skill component 190 provides the post-NLU ranker 1065 with result data 1030, the system may further engage a transactional skill component 190 after the transactional skill component 190 provides the post-NLU ranker 1065 with result data 1030 indicating the transactional skill component 190 may execute the user input.

In some instances, the post-NLU ranker 1065 may generate respective scores for first and second skills that are too close (e.g., are not different by at least a threshold difference) for the post-NLU ranker 1065 to make a confident determination regarding which skill should execute the user input. When this occurs, the system may request the user indicate which skill the user prefers to execute the user input. The system may output TTS-generated speech to the user to solicit which skill the user wants to execute the user input.

One or more models implemented by components of the orchestrator component 230, post-NLU ranker 1065, shortlister component 950, or other component may be trained and operated according to various machine learning techniques.

Figure 11:
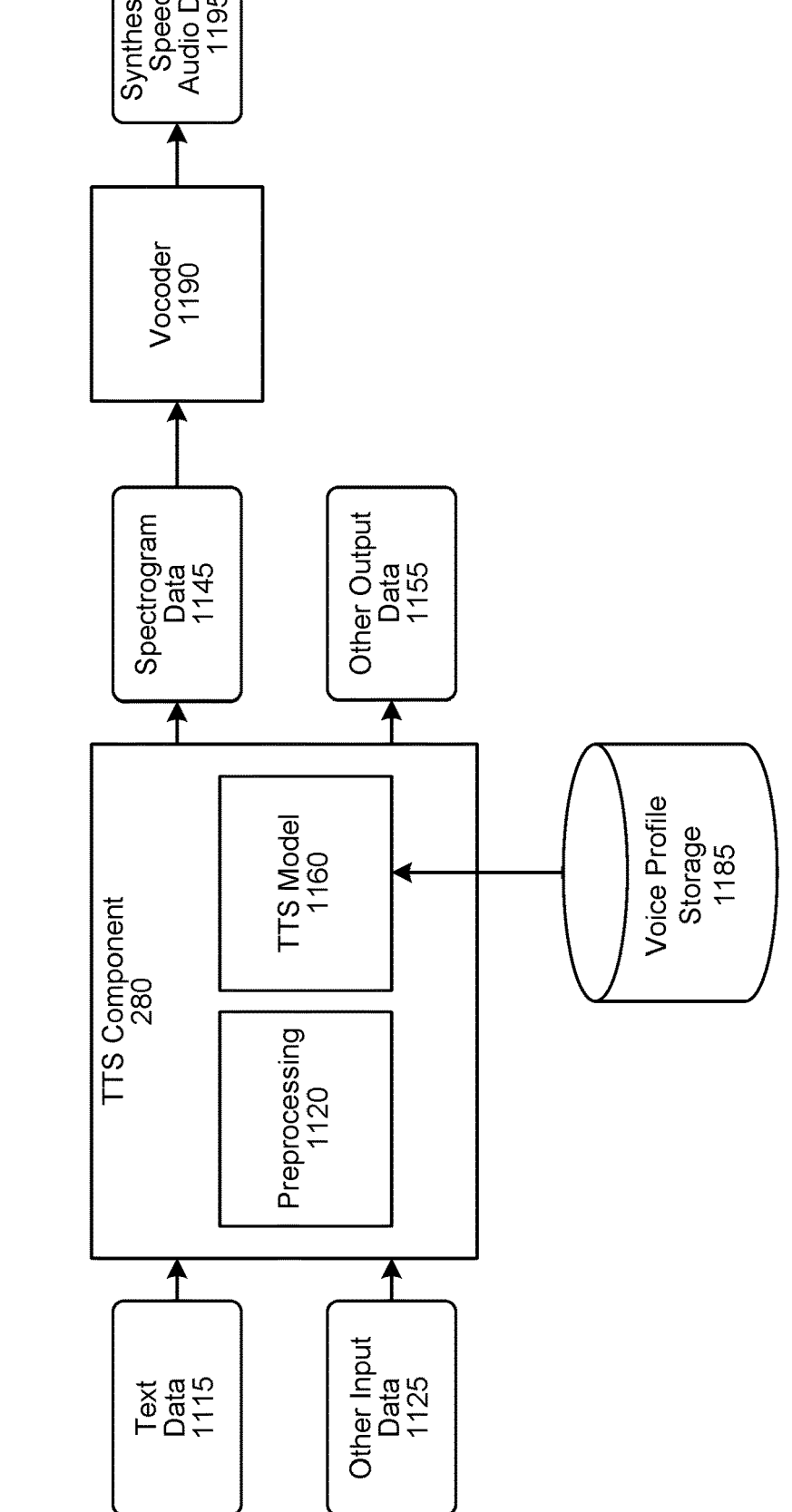
FIG. 11 is a conceptual diagram of text-to-speech components according to embodiments of the present disclosure.

Components of a system that may be used to perform unit selection, parametric TTS processing, and/or model-based audio synthesis are shown in FIG. 11. FIG. 11 is a conceptual diagram that illustrates operations for generating synthesized speech using a TTS component 280, according to embodiments of the present disclosure. The TTS component 280 may receive text data 1115 and process it using one or more TTS models 1160 to generate synthesized speech in the form of spectrogram data 1145. A vocoder 1190 may convert the spectrogram data 1145 into output speech audio data 1195, which may represent a time-domain waveform suitable for amplification and output as audio (e.g., from a loudspeaker).

The TTS component 280 may additionally receive other input data 1125. The other input data 1125 may include, for example, identifiers and/or labels corresponding to a desired speaker identity, voice characteristics, emotion, speech style, etc. desired for the synthesized speech. In some implementations, the other input data 1125 may include text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the text data 1115 and/or the other input data 1125 such as metadata accompanying a TTS request and indicating what text should be whispered (or have some other indicated audio characteristic).

The TTS component 280 may include a preprocessing component 1120 that can convert the text data 1115 and/or other input data 1125 into a form suitable for processing by the TTS model 1160. The text data 1115 may be from, for example an application, a skill component (described further below), an NLG component, another device or source, or may be input by a user. The text data 1115 received by the TTS component 280 may not necessarily be text, but may include other data (such as symbols, code, other data, etc.) that may reference text (such as an indicator of a word and/or phoneme) that is to be synthesized. The preprocessing component 1120 may transform the text data 1115 into, for example, a symbolic linguistic representation, which may include linguistic context features such as phoneme data, punctuation data, syllable-level features, word-level features, and/or emotion, speaker, accent, or other features for processing by the TTS component 280. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the text data 1115, such as surprise, anger, or fear. The speaker features may include data corresponding to a type of speaker, such as sex, age, or profession. The accent features may include data corresponding to an accent associated with the speaker, such as Southern, Boston, English, French, or other such accent. Style features may include a book reading style, poem reading style, a news anchor style, a sports commentator style, various singing styles, etc.

The preprocessing component 1120 may include functionality and/or components for performing text normalization, linguistic analysis, linguistic prosody generation, or other such operations. During text normalization, the preprocessing component 1120 may first process the text data 1115 and generate standard text, converting such things as numbers, abbreviations (such as Apt., St., etc.), symbols ($, %, etc.) into the equivalent of written out words.

During linguistic analysis, the preprocessing component 1120 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. In some implementations, the TTS model 1160 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in a storage component. The linguistic analysis performed by the preprocessing component 1120 may also identify different grammatical components such as prefixes, suffixes, phrases, punctuation, syntactic boundaries, or the like. Such grammatical components may be used by the TTS component 280 to craft a natural-sounding audio waveform output. The language dictionary may also include letter-to-sound rules and other tools that may be used to pronounce previously unidentified words or letter combinations that may be encountered by the TTS component 280. Generally, the more information included in the language dictionary, the higher quality the speech output.

The output of the preprocessing component 1120 may be a symbolic linguistic representation, which may include a sequence of phonetic units. In some implementations, the sequence of phonetic units may be annotated with prosodic characteristics. In some implementations, prosody may be applied in part or wholly by a TTS model 1160. This symbolic linguistic representation may be sent to the TTS model 1160 for conversion into audio data (e.g., in the form of Mel-spectrograms or other frequency content data format).

The TTS component 280 may retrieve one or more previously trained and/or configured TTS models 1160 from the voice profile storage 1185. A TTS model 1160 may be, for example, a neural network architecture that may be described as interconnected artificial neurons or "cells" interconnected in layers and/or blocks. In general, neural network model architecture can be described broadly by hyperparameters that describe the number of layers and/or blocks, how many cells each layer and/or block contains, what activations functions they implement, how they interconnect, etc. A neural network model includes trainable parameters (e.g., "weights") that indicate how much weight (e.g., in the form of an arithmetic multiplier) a cell should give to a particular input when generating an output. In some implementations, a neural network model may include other features such as a self-attention mechanism, which may determine certain parameters at run time based on inputs rather than, for example, during training based on a loss calculation. The various data that describe a particular TTS model 1160 may be stored in the voice profile storage 1185. A TTS model 1160 may represent a particular speaker identity and may be conditioned based on speaking style, emotion, etc. In some implementations, a particular speaker identity may be associated with more than one TTS model 1160; for example, with a different model representing a different speaking style, language, emotion, etc. in some implementations, a particular TTS model 1160 may be associated with more than one speaker identity; that is, be able to produce synthesized speech that reproduces voice characteristics of more than one character. Thus a first TTS model 1160a may be used to create synthesized speech for the first speech-processing system component 120a while a second, different, TTS model 1160b may be used to create synthesized speech for the second speech-processing system component 120b. In some cases, the TTS model 1160 may generate the desired voice characteristics based on conditioning data received or determined from the text data 1115 and/or the other input data 1125. For example a synthesized voice of the first speech-processing system component 120a may be different from a synthesized voice of the second speech-processing system component 120b.

The TTS component 280 may, based on an indication received with the text data 1115 and/or other input data 1125, retrieve a TTS model 1160 from the voice profile storage 1185 and use it to process input to generate synthesized speech. The TTS component 280 may provide the TTS model 1160 with any relevant conditioning labels to generate synthesized speech having the desired voice characteristics. The TTS model 1160 may generate spectrogram data 1145 (e.g., frequency content data) representing the synthesized speech, and send it to the vocoder 1190 for conversion into an audio signal.

The TTS component 280 may generate other output data 1155. The other output data 1155 may include, for example, indications or instructions for handling and/or outputting the synthesized speech. For example, the text data 1115 and/or other input data 1125 may be received along with metadata, such as SSML tags, indicating that a selected portion of the text data 1115 should be louder or quieter. Thus, the other output data 1155 may include a volume tag that instructs the vocoder 1190 to increase or decrease an amplitude of the output speech audio data 1195 at times corresponding to the selected portion of the text data 1115. Additionally or alternatively, a volume tag may instruct a playback device to raise or lower a volume of the synthesized speech from the device's current volume level, or lower a volume of other media being output by the device (e.g., to deliver an urgent message).

The vocoder 1190 may convert the spectrogram data 1145 generated by the TTS model 1160 into an audio signal (e.g., an analog or digital time-domain waveform) suitable for amplification and output as audio. The vocoder 1190 may be, for example, a universal neural vocoder based on Parallel WaveNet or related model. The vocoder 1190 may take as input audio data in the form of, for example, a Mel-spectrogram with 80 coefficients and frequencies ranging from 50 Hz to 12 kHz. The synthesized speech audio data 1195 may be a time-domain audio format (e.g., pulse-code modulation (PCM), waveform audio format (WAV), u-law, etc.) that may be readily converted to an analog signal for amplification and output by a loudspeaker. The synthesized speech audio data 1195 may consist of, for example, 8-, 16-, or 24-bit audio having a sample rate of 16 kHz, 24 kHz, 44.1 kHz, etc. In some implementations, other bit and/or sample rates may be used.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 12:
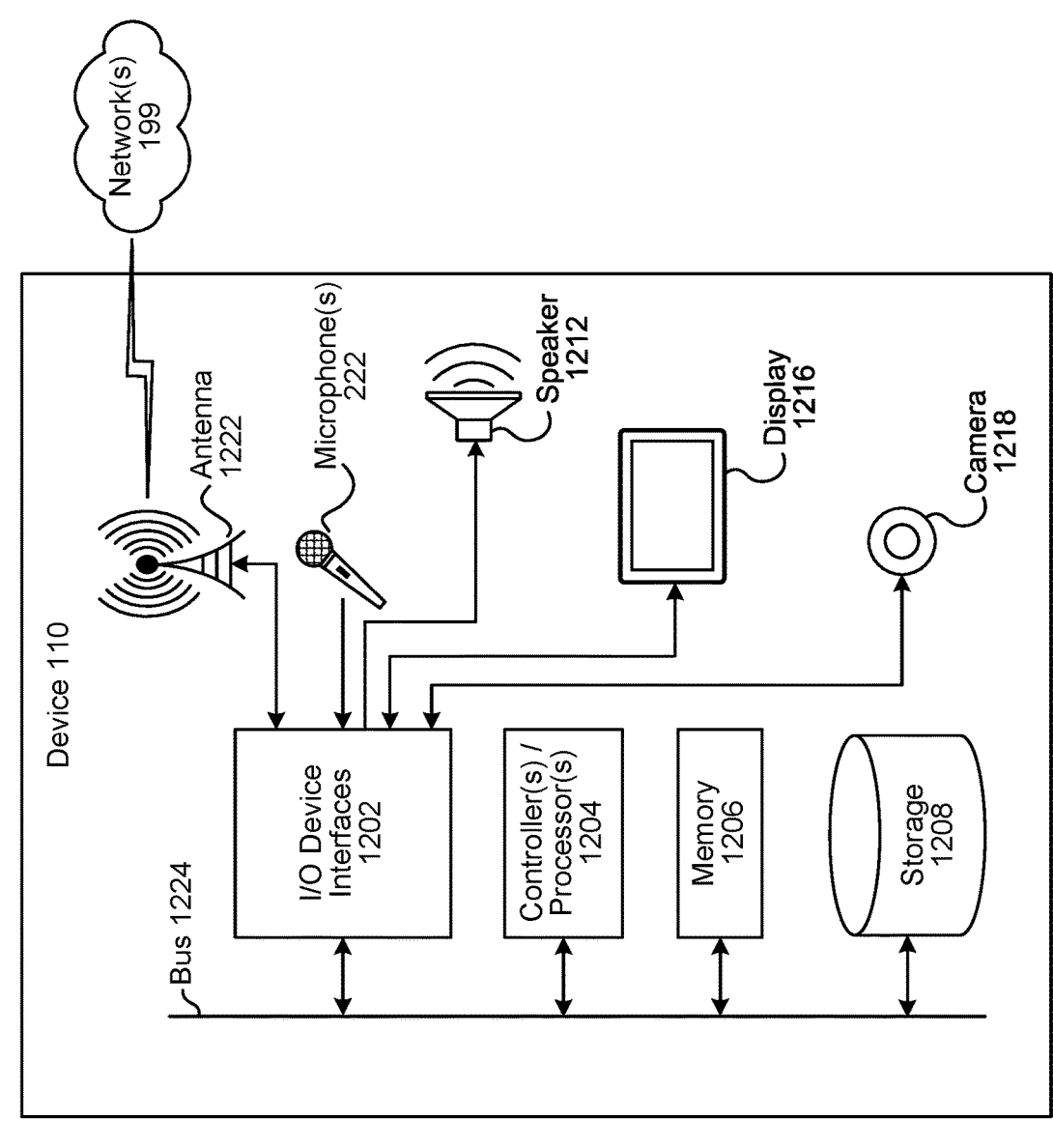
FIG. 12 is a block diagram conceptually illustrating example components of a device, according to embodiments of the present disclosure.
Figure 13:
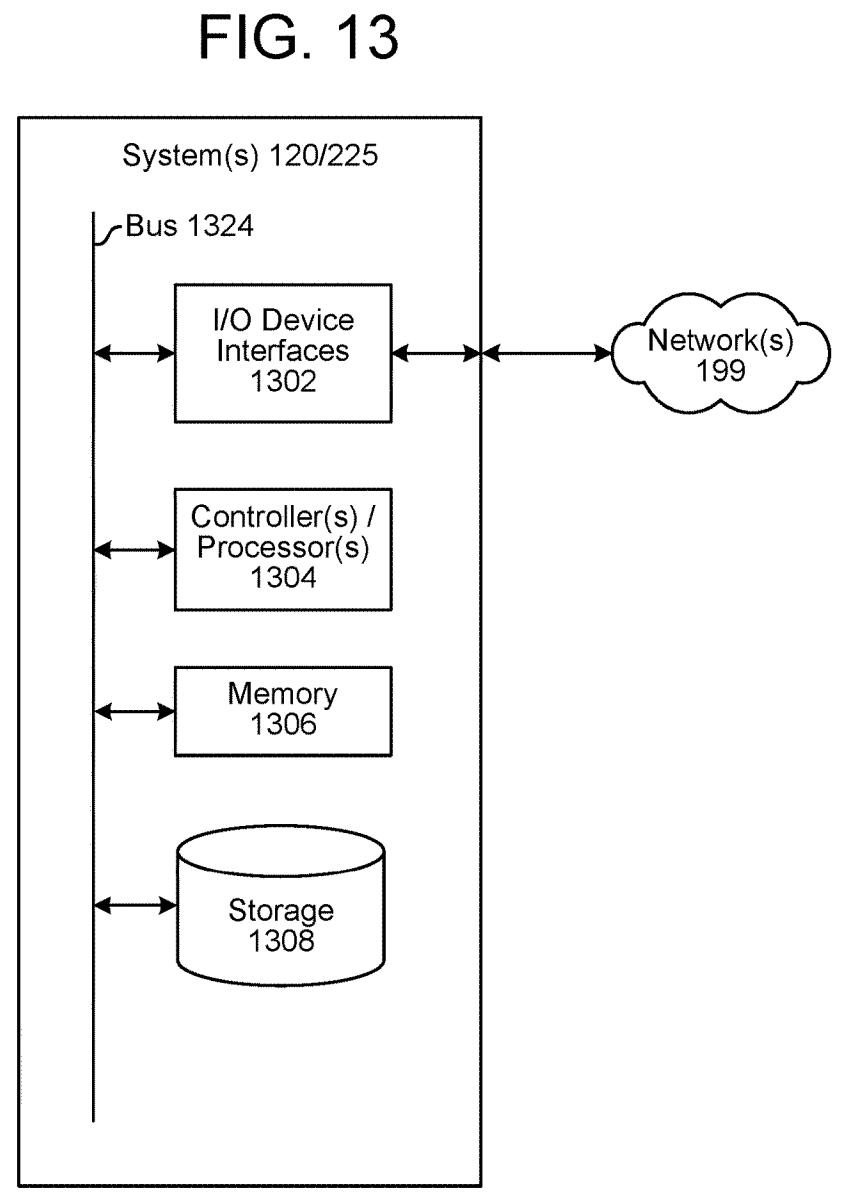

FIG. 12 is a block diagram conceptually illustrating a user device 110 that may be used with the system. FIG. 13 is a block diagram conceptually illustrating example components of a remote device, such as the natural language command processing system component 120, which may assist with ASR processing, NLU processing, etc., and a skill support system component(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the user device 110 may operate locally to a user (e.g., within a same environment so the device may receive inputs and playback outputs for the user) the server/system component 120 may be located remotely from the user device 110 as its operations may not require proximity to the user. The server/system component 120 may be located in an entirely different location from the user device 110 (for example, as part of a cloud computing system or the like) or may be located in a same environment as the user device 110 but physically separated therefrom (for example a home server or similar device that resides in a user's home or business but perhaps in a closet, basement, attic, or the like). The system component 120 may also be a version of a user device 110 that includes different (e.g., more) processing capabilities than other user device(s) 110 in a home/office. One benefit to the server/system component 120 being in a user's home/business is that data used to process a command/return a response may be kept within the user's home, thus reducing potential privacy concerns.

Multiple systems (120/225) may be included in the overall system 100 of the present disclosure, such as one or more natural language processing system components 120 for performing ASR processing, one or more natural language processing system components 120 for performing NLU processing, one or more skill support system components 225, etc. In operation, each of these systems may include computer-readable and computer-executable instructions that reside on the respective device (120/225), as will be discussed further below.

Each of these devices (110/120/225) may include one or more controllers/processors (1204/1304), which may each include a central processing unit (CPU) for processing data and computer-readable instructions, and a memory (1206/1306) for storing data and instructions of the respective device. The memories (1206/1306) may individually include volatile random access memory (RAM), non-volatile read only memory (ROM), non-volatile magnetoresistive memory (MRAM), and/or other types of memory. Each device (110/120/225) may also include a data storage component (1208/1308) for storing data and controller/processor-executable instructions. Each data storage component (1208/1308) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (1202/1302).

Computer instructions for operating each device (110/120/225) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (110/120/225) includes input/output device interfaces (1202/1302). A variety of components may be connected through the input/output device interfaces (1202/1302), as will be discussed further below. Additionally, each device (110/120/225) may include an address/data bus (1224/1324) for conveying data among components of the respective device. Each component within a device (110/120/225) may also be directly connected to other components in addition to (or instead of) being connected to other components across the bus (1224/1324).

Referring to FIG. 12, the user device 110 may include input/output device interfaces 1202 that connect to a variety of components such as an audio output component such as a speaker 1212, a wired headset or a wireless headset (not illustrated), or other component capable of outputting audio. The user device 110 may also include an audio capture component. The audio capture component may be, for example, a microphone 222 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 110 may additionally include a display 1216 for displaying content. The user device 110 may further include a camera 1218.

Via antenna(s) 1222, the input/output device interfaces 1202 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1202/1302) may also include communication components that allow data to be exchanged between devices such as different physical servers in a collection of servers or other components.

The components of the user device(s) 110, the natural language command processing system component 120, or a skill support system component(s) 225 may include their own dedicated processors, memory, and/or storage. Alternatively, one or more of the components of the user device(s) 110, the natural language command processing system component 120, or a skill support system component(s) 225 may utilize the I/O interfaces (1202/1302), processor(s) (1204/1304), memory (1206/1306), and/or storage (1208/1308) of the user device(s) 110, natural language command processing system component 120, or the skill support system component(s) 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user device 110, the natural language command processing system component 120, and a skill support system component(s) 225, as described herein, are illustrative, and may be located as a stand-alone device or may be included, in whole or in part, as a component of a larger device or system. As can be appreciated, a number of components may exist either on a system component 120 and/or on user device 110. For example, language processing components 292 (which may include ASR component 250 and NLU component 260), language output components 293 (which may include the NLG component 279 and TTS component 280), etc., for example as illustrated in FIG. 2. Unless expressly noted otherwise, the system version of such components may operate similarly to the device version of such components and thus the description of one version (e.g., the system version or the local version) applies to the description of the other version (e.g., the local version or system version) and vice-versa.

As illustrated in FIG. 14, multiple devices (110a-110n, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection user device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, autonomously motile user device 110k (e.g., a robot), etc., may be connected to the network(s) 199 through a wireless service provider, over a Wi-Fi or cellular network connection, or the like. Other devices are included as network-connected support devices, such as the natural language command processing system component 120, the skill support system component(s) 225, and/or others. The support devices may connect to the network(s) 199 through a wired connection or wireless connection. Networked devices may capture audio using one-or-more built-in or connected microphones or other audio capture devices, with processing performed by ASR components, NLU compo-
nents, or other components of the same device or another
device connected via the network(s) 199, such as the ASR
component 250, the NLU component 260, etc. of the natural
language command processing system component 120.

The concepts disclosed herein may be applied within a
number of different devices and computer systems, includ-
ing, for example, general-purpose computing systems,
speech processing systems, and distributed computing envi-
ronments.

The above aspects of the present disclosure are meant to
be illustrative. They were chosen to explain the principles
and application of the disclosure and are not intended to be
exhaustive or to limit the disclosure. Many modifications
and variations of the disclosed aspects may be apparent to
those of skill in the art. Persons having ordinary skill in the
field of computers and speech processing should recognize
that components and process steps described herein may be
interchangeable with other components or steps, or combi-
nations of components or steps, and still achieve the benefits
and advantages of the present disclosure. Moreover, it
should be apparent to one skilled in the art, that the disclo-
sure may be practiced without some or all of the specific
details and steps disclosed herein. Further, unless expressly
stated to the contrary, features/operations/components, etc.
from one embodiment discussed herein may be combined
with features/operations/components, etc. from another
embodiment discussed herein.

Aspects of the disclosed system may be implemented as
a computer method or as an article of manufacture such as
a memory device or non-transitory computer readable stor-
age medium. The computer readable storage medium may
be readable by a computer and may comprise instructions
for causing a computer or other device to perform processes
described in the present disclosure. The computer readable
storage medium may be implemented by a volatile computer
memory, non-volatile computer memory, hard drive, solid-
state memory, flash drive, removable disk, and/or other
media. In addition, components of system may be imple-
mented as in firmware or hardware.

Conditional language used herein, such as, among others,
"can," "could," "might," "may," "e.g.," and the like, unless
specifically stated otherwise, or otherwise understood within
the context as used, is generally intended to convey that
certain embodiments include, while other embodiments do
not include, certain features, elements and/or steps. Thus,
such conditional language is not generally intended to imply
that features, elements, and/or steps are in any way required
for one or more embodiments or that one or more embodi-
ments necessarily include logic for deciding, with or without
other input or prompting, whether these features, elements,
and/or steps are included or are to be performed in any
particular embodiment. The terms "comprising," "includ-
ing," "having," and the like are synonymous and are used
inclusively, in an open-ended fashion, and do not exclude
additional elements, features, acts, operations, and so forth.
Also, the term "or" is used in its inclusive sense (and not in
its exclusive sense) so that when used, for example, to
connect a list of elements, the term "or" means one, some,
or all of the elements in the list.

Disjunctive language such as the phrase "at least one of X,
Y, Z," unless specifically stated otherwise, is understood
with the context as used in general to present that an item,
term, etc., may be either X, Y, or Z, or any combination
thereof (e.g., X, Y, and/or Z). Thus, such disjunctive lan-
guage is not generally intended to, and should not, imply that certain embodiments require at least one of X, at least one
of Y, or at least one of Z to each be present.

As used in this disclosure, the term "a" or "one" may
include one or more items unless specifically stated other-
wise. Further, the phrase "based on" is intended to mean
"based at least in part on" unless specifically stated other-
wise.

What is claimed is:

1. A computer-implemented method comprising:

receiving, from a first user device, first audio data repre-
senting first speech;

determining that the first user device supports session
context such that multiple inputs pertaining to a first
multi-turn interaction are to be processed according to
a first session context;

receiving a first indication that user inputs received by the
first user device are to be processed according to a
user-selected profile;

performing speech processing of the first audio data to
determine first input data and a first skill component for
processing the first input data;

performing user recognition using the first audio data to
determine a first value representing a first likelihood
that the first speech corresponds to a first user profile;

determining that the first value fails to satisfy a first
condition;

in response to determining that the first value fails to
satisfy the first condition, creating the first session
context using the user-selected profile, the first session
context corresponding to the first multi-turn interaction
with the first skill component;

processing the first input data using the first skill com-
ponent and the first session context to generate first
response data; and causing the first user device to present a first output based
on the first response data.

2. The computer-implemented method of claim 1, further
comprising:

receiving, from the first user device, second audio data
representing a second input;

performing user recognition using the second audio data
to determine that the second input corresponds to a
second user profile different from the user-selected
profile;

determining that the second audio data corresponds to the
first multi-turn interaction;

in response to determining that the second audio data
corresponds to the first multi-turn interaction, process-
ing the second audio data using the first session context
to generate second response data; and causing the first user device to present a second output
based on the second response data.

3. The computer-implemented method of claim 1, further
comprising:

receiving, from a second user device, second audio data
representing second speech;

determining that the second user device does not support
session context;

determining that the second audio data corresponds to a
second multi-turn interaction, the second multi-turn
interaction corresponding to a first profile context;

performing user recognition using the second audio data
to determine that the second speech corresponds to a
second profile context different from the first profile
context;

in response to determining that the second speech corre-
sponds to the second profile context, processing the second audio data using the second profile context to generate second response data; and causing the second user device to present a second output based on the second response data.

4. The computer-implemented method of claim 3, wherein:

receiving, from a second user device, second audio data representing second speech;

determining that the second user device does not support session context;

determining that the second audio data corresponds to a second multi-turn interaction corresponding to a first profile context;

performing user recognition using the second audio data to determine that the second speech fails to meet a threshold for matching a user profile;

in response to determining that the second speech fails to meet a threshold for matching a user profile, processing the second audio data using the first profile context to generate second response data; and causing the second user device to present a second output based on the second response data.

5. A computer-implemented method comprising:

receiving, at a first user device, first input data;

receiving first user recognition data indicating that the first input data corresponds to a first user profile;

determining that the first input data is associated with a first session, the first session corresponding to a plurality of user inputs of a first multi-turn interaction between the first user device and a first application;

identifying a second user profile, different from the first user profile, for processing the plurality of user inputs corresponding to the first session;

in response to determining that the first input data is associated with the first session, processing the first input data using the second user profile to generate first response data; and causing the first user device to present a first output based on the first response data.

6. The computer-implemented method of claim 5, further comprising:

receiving, prior to receiving the first input data, second input data;

receiving second user recognition data indicating that the second input data corresponds to the second user profile;

determining that the second input data represents a request to initiate the first multi-turn interaction;

in response to determining that the second input data represents a request to initiate the first multi-turn interaction, creating the first session; and associating the first session with the second user profile.

7. The computer-implemented method of claim 5, further comprising:

receiving, prior to receiving the first input data, a first indication that user inputs received by the first user device are to be processed according to the second user profile;

receiving, prior to receiving the first input data, second input data;

determining that the second input data represents a request to initiate the first multi-turn interaction;

in response to receiving the first indication, creating the first session; and associating the first session with the second user profile.

8. The computer-implemented method of claim 5, further comprising:

receiving, prior to receiving the first input data, a first indication that user inputs received by the first user device are to be processed by the first application according to the second user profile; and receiving a second indication that user inputs received by the first user device are to be processed by a second application, different from the first application, according to a third user profile different from the second user profile.

9. The computer-implemented method of claim 5, further comprising:

receiving, at a second user device, second input data;

determining that the second input data represents a request to initiate a second multi-turn interaction;

receiving second user recognition data indicating that the second input data corresponds to a second user profile;

in response to receiving the second user recognition data, associating the second multi-turn interaction with the second user profile;

processing the second input data using the second user profile to generate second response data; and causing the second user device to present a second output based on the second response data.

10. The computer-implemented method of claim 9, wherein:

receiving, at the second user device after receiving the second input data, third input data;

determining that the third input data corresponds to the second multi-turn interaction;

determining that the second user device does not support session context;

determining that the third input data corresponds to a third user profile different from the second user profile;

in response to determining that the second user device does not support session context and determining that the third input data corresponds to the third user profile, processing the third input data using the third user profile to generate third response data; and causing the second user device to present a third output based on the third response data.

11. The computer-implemented method of claim 5, further comprising:

determining a skill to be used to process the first input data; and determining that the skill supports session context such that multiple inputs pertaining to a single interaction with the skill are to be processed according to a first profile context, wherein processing the first input data using the second user profile is additionally based on determining that the skill supports session context.

12. The computer-implemented method of claim 5, further comprising:

receiving, prior to receiving the first input data, a first indication that user inputs received by the first user device are to be processed according to the second user profile;

receiving second input data representing a second user input;

receiving second user recognition data indicating that the second input data corresponds to a third user profile;

determining a skill to be used to process the second input data;

determining that the skill does not support session context; and in response to determining that the skill does not support session context, processing the second input data using the third user profile to generate second response data.

63

13. A system, comprising:

at least one processor; and at least one memory comprising instructions that, when executed by the at least one processor, cause the system to:

receive, at a first user device, first input data;

receive first user recognition data indicating that the first input data corresponds to a first user profile;

determine that the first input data is associated with a first session, the first session corresponding to a plurality of user inputs of a first multi-turn interaction between the first user device and a first application;

identify a second user profile, different from the first user profile, for processing the plurality of user inputs corresponding to the first session;

in response to determining that the first input data is associated with the first session, process the first input data using the second user profile to generate first response data; and cause the first user device to present a first output based on the first response data.

14. The system of claim 13, wherein the at least one memory further comprises instructions that, when executed by the at least one processor, further cause the system to:

receive, prior to receiving the first input data, second input data;

receive second user recognition data indicating that the second input data corresponds to the second user profile;

determine that the second input data represents a request to initiate the first multi-turn interaction;

in response to determining that the second input data represents a request to initiate the first multi-turn interaction, create the first session; and associate the first session with the second user profile.

15. The system of claim 13, wherein the at least one memory further comprises instructions that, when executed by the at least one processor, further cause the system to:

receive, prior to receiving the first input data, a first indication that user inputs received by the first user device are to be processed according to the second user profile;

receive, prior to receiving the first input data, second input data;

determine that the second input data represents a request to initiate the first multi-turn interaction;

in response to receiving the first indication, create the first session; and associate the first session with the second user profile.

16. The system of claim 13, wherein the at least one memory further comprises instructions that, when executed by the at least one processor, further cause the system to:

receive, prior to receiving the first input data, a first indication that user inputs received by the first user device are to be processed by the first application according to the second user profile; and receive a second indication that user inputs received by the first user device are to be processed by a second application, different from the first application, according to a third user profile different from the second user profile.

17. The system of claim 13, wherein the at least one memory further comprises instructions that, when executed by the at least one processor, further cause the system to:

receive, at a second user device, second input data;

determine that the second input data represents a request to initiate a second multi-turn interaction;

receive second user recognition data indicating that the second input data corresponds to a second user profile;

in response to receiving the second user recognition data, associate the second multi-turn interaction with the second user profile;

process the second input data using the second user profile to generate second response data; and cause the second user device to present a second output based on the second response data.

18. The system of claim 17, wherein the at least one memory further comprises instructions that, when executed by the at least one processor, further cause the system to:

receive, at the second user device after receiving the second input data, third input data;

determine that the third input data corresponds to the second multi-turn interaction;

determine that the second user device does not support session context;

determine that the third input data corresponds to a third user profile different from the second user profile;

in response to determining that the second user device does not support session context and determining that the third input data corresponds to the third user profile, process the third input data using the third user profile to generate third response data; and cause the second user device to present a third output based on the third response data.

19. The system of claim 13, wherein the at least one memory further comprises instructions that, when executed by the at least one processor, further cause the system to:

determine a skill to be used to process the first input data; and determine that the skill supports session context such that multiple inputs pertaining to a single interaction with the skill are to be processed according to a first profile context, wherein processing the first input data using the second user profile is additionally based on determining that the skill supports session context.

20. The system of claim 13, wherein the at least one memory further comprises instructions that, when executed by the at least one processor, further cause the system to:

receive, prior to receiving the first input data, a first indication that user inputs received by the first user device are to be processed according to the second user profile;

receive second input data representing a second user input;

receive second user recognition data indicating that the second input data corresponds to a third user profile;

determine a skill to be used to process the second input data;

determine that the skill does not support session context; and in response to determining that the skill does not support session context, process the second input data using the third user profile to generate second response data.

* * * * *